US007264243B2

(12) United States Patent
Yoseloff et al.

(10) Patent No.: US 7,264,243 B2
(45) Date of Patent: Sep. 4, 2007

(54) SIX-CARD POKER GAME

(75) Inventors: Mark L. Yoseloff, Henderson, NV (US); R. Brooke Dunn, Henderson, NV (US); Philip S. Smith, Las Vegas, NV (US); Roger M. Snow, Las Vegas, NV (US)

(73) Assignee: Shuffle Master, Inc, Las Vegas, NV (US)

( * ) Notice: Subject to any disclaimer, the term of this patent is extended or adjusted under 35 U.S.C. 154(b) by 275 days.

(21) Appl. No.: 10/938,483

(22) Filed: Sep. 10, 2004

(65) Prior Publication Data

US 2005/0082760 A1 Apr. 21, 2005

Related U.S. Application Data

(63) Continuation-in-part of application No. 10/864,051, filed on Jun. 8, 2004, which is a continuation-in-part of application No. 10/152,325, filed on May 20, 2002, now abandoned, application No. 10/938,483, which is a continuation-in-part of application No. 10/764,995, filed on Jan. 26, 2004, which is a continuation-in-part of application No. 10/764,827, filed on Jan. 26, 2004, which is a continuation-in-part of application No. 10/764,994, filed on Jan. 26, 2004.

(51) Int. Cl.
*A63F 1/00* (2006.01)
*A63F 13/00* (2006.01)

(52) U.S. Cl. ...................... 273/292; 273/309; 273/274; 463/13

(58) Field of Classification Search ................ 273/292, 273/274, 309; 463/13, 12
See application file for complete search history.

(56) References Cited

U.S. PATENT DOCUMENTS 4,743,022 A 5/1988 Wood (Continued)

FOREIGN PATENT DOCUMENTS

| | | |
|---|---|---|
| GB | 667345 | 2/1952 |
| GB | 94/14822 | 7/1994 |
| GB | 94/26324 | 12/1994 |

OTHER PUBLICATIONS

KISS Guide To Gambling by John Marchel, DK Publishing, Inc., 2001, Glossary: No-Limit, p. 344.*

(Continued)

*Primary Examiner*—Benjamin Layno
(74) *Attorney, Agent, or Firm*—Mark A. Litman & Associates, P.A.

(57) ABSTRACT

A live casino operated tables, games, video games, automated games with live players, or by having a dealer or banker provided with a casino table poker game utilizes at least one deck of playing cards, the game comprising: each player placing at least one wager to participate in the casino game; dealing a first number of cards to a dealer as a banker's hand, the first number of cards being greater than the number of cards to be used in determination of a poker rank hand for the banker's hand; dealing a second number of cards to each player, the second number of cards being greater than the number of cards to be used in determination of a poker rank hand for each player; the dealer discarding at least one card from the banker's hand to form a resulting single dealer hand; each player discarding at least one card to form a resulting player's hand for each player, wherein the number of cards in resulting player's hands and the resulting banker's hand are equal; and resolving each player hand against the banker's hand according to predetermined game rules. The initial player's wagers must be at least matched with a Game Bet (or play bet of 1× or more of the Ante) to remain in the game after players have received their cards. The Game Bet multiple is selected by the player. The game may be a live table game or part of an interactive gaming system.

44 Claims, 9 Drawing Sheets

U.S. PATENT DOCUMENTS

| | | | |
|---|---|---|---|
| 4,836,553 | A | 6/1989 | Suttle et al. |
| 4,861,041 | A | 8/1989 | Jones et al. |
| 5,022,653 | A | 6/1991 | Suttle et al. |
| 5,046,736 | A | 9/1991 | Bridgeman et al. |
| 5,098,107 | A | 3/1992 | Boylan et al. |
| 5,174,579 | A | 12/1992 | Griffiths |
| 5,255,915 | A | 10/1993 | Miller |
| 5,257,784 | A | 11/1993 | Boylan et al. |
| 5,257,810 | A | 11/1993 | Schorr et al. |
| 5,265,877 | A | 11/1993 | Boylan et al. |
| 5,275,415 | A | 1/1994 | Wisted |
| 5,288,081 | A | 2/1994 | Breeding |
| 5,294,128 | A | 3/1994 | Marquez |
| 5,308,065 | A | 5/1994 | Bridgeman et al. |
| 5,366,228 | A | 11/1994 | Kangsanaraks |
| 5,377,973 | A | 1/1995 | Jones et al. |
| 5,377,994 | A | 1/1995 | Jones |
| 5,397,128 | A | 3/1995 | Hesse et al. |
| 5,431,408 | A | 7/1995 | Adams |
| 5,489,101 | A | 2/1996 | Moody |
| 5,494,295 | A | 2/1996 | Potter et al. |
| 5,505,449 | A | 4/1996 | Eberhardt et al. |
| 5,531,448 | A | 7/1996 | Moody |
| 5,538,252 | A | 7/1996 | Green |
| 5,584,486 | A | 12/1996 | Franklin |
| 5,630,757 | A | 5/1997 | Gagin et al. |
| 5,653,444 | A | 8/1997 | Dahl |
| 5,660,393 | A | 8/1997 | Dreger |
| 5,673,917 | A | 10/1997 | Vancura |
| 5,685,774 | A | 11/1997 | Webb |
| 5,697,614 | A | 12/1997 | Potter et al. |
| 5,718,430 | A | 2/1998 | Arampakul et al. |
| 5,732,950 | A | 3/1998 | Moody |
| 5,762,340 | A | 6/1998 | Feola |
| 5,851,011 | A | 12/1998 | Lott |
| 5,897,436 | A | 4/1999 | Singer et al. |
| 6,012,719 | A | 1/2000 | Webb |
| 6,027,119 | A | 2/2000 | De Lisle |
| 6,056,641 | A | 5/2000 | Webb |
| 6,113,103 | A | 9/2000 | Mostashari |
| 6,170,827 | B1 | 1/2001 | Lombardo et al. |
| 6,206,373 | B1 | 3/2001 | Garrod |
| 6,229,534 | B1 | 5/2001 | Gerra et al. |
| 6,237,916 | B1 | 5/2001 | Webb |
| 6,273,424 | B1 | 8/2001 | Breeding |
| 6,345,823 | B1 | 2/2002 | Webb |
| 6,607,443 | B1 | 8/2003 | Miyamoto et al. |
| 6,698,759 | B2 | 3/2004 | Webb et al. |
| 2001/0048197 | A1* | 12/2001 | Lo ............................ 273/292 |
| 2002/0103018 | A1* | 8/2002 | Rommerdahl et al. ........ 463/16 |
| 2002/0175468 | A1 | 11/2002 | Kenny et al. |
| 2003/0199316 | A1 | 10/2003 | Miyamoto et al. |
| 2004/0150163 | A1 | 8/2004 | Kenny et al. |
| 2004/0160006 | A1 | 8/2004 | Kenny et al. |

OTHER PUBLICATIONS

Scarne's Guide to Modern Poker, Constable and Company Limited, 1980, "Brag", pp. 159-160.

Show Five Cards, Scarne's Encyclopedia of Games, John Scarne, Harper & Row Publishers, pp. 28-29, 1973.

Copyright filing with the Bureau voor de Intellectuele Eigendom, Aruba, 13 pgs (Jan. 13, 1998).

Published Rule Sheet for Casino Poker from Vegas World, 1 page (1982).

Card Craps, Scarne's Encyclopedia of Card Games, pp. 321-323, (1948).

Three Card Poker Disclosure by Derek J. Webb.

* cited by examiner

SIX-CARD POKER GAME

RELATED APPLICATIONS DATA

This application is a continuation-in-part of U.S. patent application Ser. No. 10/864,051, filed Jun. 8, 2004, which is a continuation-in-part of U.S. patent application Ser. No. 10/152,325 filed May 20, 2002 titled: FOUR CARD POKER AND ASSOCIATED GAMES. This application is also a continuation-in-part of U.S. patent applications Ser. Nos. 10/764,995; 10/764,827 and 10/764,994, all three of these applications filed on Jan. 26, 2004.

BACKGROUND OF THE INVENTION

1. Field of the Invention

The present described technology relates to the field of games, card games, wagering card games, player-banked games and especially poker-type casino wagering games. More specifically, the described methods and apparatus are an enhancement to a game of poker that may be performed as live casino operated tables, games, video games, automated games with live players, or by having a dealer or banker provided with a casino table poker game.

2. Background of the Art

As a leisure time activity, poker and other card games have been popular for many years. The capital requirements for playing poker and other table card games are very low. All that are needed are one or more decks of cards, a playing surface and a few participants. Five card poker is a game that most people know how to play and many games have been developed using the same basic priority or rank order of winning poker hands: Royal Flush, Straight Flush, Four of a Kind, Full House, Flush, Straight, Three of a Kind, Two Pair, One Pair and high card(s) in hand.

For some time, it had been difficult to adapt the rules of poker into a casino table game in which each player plays against the house, rather than against other players. Although club-type games with players wagering against each other have been popular, it was desirable for a game to be played where the house received a more direct payback from the game. In a conventional poker game, a number of players (greater than one) are each dealt a poker hand by one player (or the house dealer who does not play in the game) who acts as the dealer. The player with the highest ranking hand based on the established priority ranking of poker hands wins. Each player in turn deals a hand as the game continues. It is usually essential to have wagering steps in the game to maintain the interest and excitement of the game. In the absence of wagering, there is little to commend the play of poker.

Many places, both within and without the United States, have legalized gaming. Poker is one of the games of chance offered in both casinos and card rooms. In a conventional card room poker game, the house provides a dealer, the playing cards, the table and chairs, but the house does not play a hand. The house collects a nominal percentage of each player's bet ("the rake") that compensates the house for providing the facilities to the players. Alternatively, the house may charge each player a set amount per hand or for a specified length of time of play. Each player is competing not against the house, but against all the other players with the highest hand winning the total of all the wagers made on that hand.

Many people do not like to play card room poker because each player is competing against his fellow players, not against the house. Many people would rather attempt to win money from an impersonal source, the house or the casino, rather than from their fellow players with whom they may be acquainted. Card room poker also tends to not offer any bonus payments for particularly good hands, although bonuses are sometimes paid for highest hands in tournaments or for specific combinations of hands at poker tables (e.g., a losing hand of at least a full house). While a Royal Flush is a rare occurrence and generates a thrill for any poker player, the player collects the same total payout that he would have collected if the hand was won with a Three-of-a-Kind.

In the past fifteen years, a number of card games have been disclosed to provide poker-type card games as house-banked casino table games. These games have focused on a number of elements in providing excitement and staying power for the games. The games must be quickly understood by players. The rules must be simple and clear. The resolution of wagers by the dealer must be easily accomplished. The reading of hands by a dealer must not be complex. In addition, the games must provide a high enough hit frequency to appeal to players, yet allow the house to retain a profitable portion of the wagers. These needs have limited the number of games that have been designed and successfully introduced into the casino gaming market.

Among the successful games are Let It Ride Bonus® poker, Three Card Poker® game and Caribbean Stud® poker. These games have each achieved a high level of commercial success with different formats and attributes.

Let It Ride® stud poker is described in U.S. Pat. No. 5,288,081. The Bonus version of the game is described in U.S. Pat. No. 6,273,424. In this game, the player makes a wager in three parts, three cards are dealt to each player (there may be only a single player), and two common cards are dealt face down in front of the dealer. The player examines his/her three cards, evaluates the likelihood of a ranked hand (e.g., at least a pair of tens) being achieved with those three cards and the as yet unseen common cards. The player, based on judgment of that likelihood, may elect to withdraw the first of the three-part wager or keep the wager at risk. Upon the player making that decision, and withdrawing or allowing the first wager to remain at risk, a first of the common cards is turned face up. The player then can make another decision with regard to the play of the hand and whether there is a changed potential for a ranked hand. A second portion of the three-part wager is then withdrawn or allowed to remain at risk. After this decision, the last common card is exposed, and the rank of each player's hand, including the common cards, is evaluated. Payments are made to each player based on only the rank of hand achieved and the number of wagers left on the table from the original three-part wager. As noted, at least one wager must remain, as only two parts can have been withdrawn. Wagers are paid off at rates (or odds), for example, of 1:1 for pairs of at least 10's, 2:1 for two pairs, 3:1 for three-of-a-kind, 5:1 for straights, 7:1 for flushes, 12:1 for full houses, 50:1 for four-of-a-kind, 250:1 for straight flushes, and 1000:1 for Royal Flushes. The specific payout odds can be varied and often casinos choose payout tables that help them achieve a desired percentage hold. Side bonus wagers may also be placed in which ranked hands over three-of-a-kind receive fixed or progressive bonuses, such as $25,000 for a Royal Flush. The bonus payouts and hand combinations are typically displayed on a payout table on the table surface. The winning bonus combinations are typically a higher-ranking subset of the winning base game outcomes.

The Three Card Poker® game (e.g., as described in U.S. Pat. No. 5,685,774) deals three cards to each player and three cards to the dealer, all face down. Initially one or two optional wagers may be made by the player. One such wager is for the "Pair Plus" bonus bet, a bet on achieving a winning combination included in a payout table. Another wager is the game ante on which the player competes against the dealer. The Pair Plus bet in one example of the invention is a wager that the three card hand will have a rank of at least one pair or more. The hand is paid off in multiples of the bet depending upon the rank of the hand, with up to 40:1 or more paid out for three-of-a-kind. In the ante wager, if the player wants to compete against the dealer's hand (after viewing the rank of the player's hand), an additional wager equal to one or two times the ante must be placed by the player. House rules typically dictate that the amount of the Bet is 2× the amount of the Ante. The dealer's hand is then exposed. If the dealer does not have a hand of at least a certain qualifying rank (e.g., at least Queen high), the dealer's hand is not in play. If the player has not made the additional wager, the ante is collected by the dealer at some point in the play of the game. If the player has made the additional wager, the ante is paid off to the player if the dealer's hand is not as high a rank as the player's hand. If the dealer's hand has qualified, and the dealer's hand is higher than the player's hand, then the ante and the additional wager are collected by the house. If the dealer's hand qualifies (e.g., at least Queen high) and is lower than the player's hand rank, both the ante and additional wager are paid off, with multiples payable to the ante wager for certain high ranking hands (e.g., straights, flushes, straight flushes, three-of-a-kind, etc.). The ranking of the various poker hands is different in the three card game than in five card poker games.

In Caribbean Stud® poker, described in U.S. Pat. No. 4,836,533, a player makes an initial ante wager, and five cards are dealt to each player and to a dealer. The dealer exposes one of the five cards to influence the player. The player decides if the dealt player hand is of sufficient rank to compete against the dealer's hand. The player may fold the player's hand at that time, or continue the game by placing an additional wager (referred to as the "Bet") that is usually required to be twice the value of the ante. The dealer's hand qualifies for active play against the Bet with a rank of at least Ace-King. If the dealer qualifies, the rank of the players' hands are compared with the rank of the dealer's hand. Players with hands of higher rank than the dealer's hand win both the ante and the Bet. Players with hands of lower rank than the dealer's hand lose both the ante and the Bet. If an initial side bet (often referred to as the Jackpot side bet) has been made by the player, ranked hands of particularly high values (e.g., at least a Flush) are paid absolute bonus amounts or may be paid out of a progressive jackpot. This bonus side bet is paid whether or not the player's hand rank exceeds the rank of the dealer's hand.

Potter et al., U.S. Pat. Nos. 5,494,295 and 5,697,614 describe a casino table card game and apparatus in which a player may select any number of predetermined hand ranking rules to apply to the play of a hand. A player is dealt an initial, partial hand, and the player then elects from that initial hand which set(s) of predetermined hand ranking rules apply to the hand. In a preferred game, the dealer receives two separate bank hands, one that utilizes the hand ranks of standard poker and one that utilizes the hand ranks of low-ball poker. Once each player has received four of his five cards, each player decides which of the dealer's two hands to play against, with the option of playing against both (as in selecting both ways in a Hi-Low poker game). Then each player receives his or her fifth, and last, card. At this point, the "bank" hands are exposed and each player's hand is compared to the specific "bank" hand, or hands, that they played against, winners are determined, and wagers are settled.

U.S. Pat. No. 6,170,827 describes another poker-type casino table card game. This game may be played at a table with as many as seven players competing against a dealer. The play of the game is fairly complex, with each player having both multiple hands and utilization of a dealer's card. One method of play is to provide each player with three cards, and the dealer is provided with four cards. The dealer's play of cards is predetermined, while the players may select their desired holding. Player's hands are competing directly against the dealer's hand in each of the hands made by the player and the dealer.

U.S. Pat. No. 6,653,444 describes a method of playing a stud poker game in a player-versus-dealer gaming table environment. A player places an "ante" wager whereupon he and the dealer receive a three-card portion of a five-card poker hand with two of the dealer's three cards face up. The player may then compare his partial three-card poker hand with the dealer's two up cards and exercise his option of either "surrendering" the original "ante" wager or placing an additional "challenge" wager to receive the remainder of his five-card poker hand. After he and the dealer have received their entire five-card poker hand, an ordinary showdown takes place. If the player's poker hand beats the dealer's, then the house pays even money on the original "ante" wager and on the challenge wager. In a preferred embodiment, the player must have at least an ace high hand to prevail. In a further enhancement, the player may also place an optional "side" wager at the time that the "ante" wager is made in order to receive a fixed or return for forming certain hands and, in particular, for spelling a word such as "VEGAS" using letters carried by particular cards in an otherwise standard 52-card deck. The "side" wager is paid to the house, along with the "ante" wager, in the event of a surrender.

U.S. Pat. No. 5,489,101 describes a poker game in which a player tries to form a five card poker hand that has the highest poker hand ranking. In the house banked version, all players play against the house and not against each other. The game is played with a standard fifty-two card deck. The game consists of a dealer and from one to seven players. Each player makes a bet and a portion of each bet may be allocated to a progressive jackpot. The dealer deals five cards to each player. The dealer then deals six cards as the community cards which are arranged face down in three rows in a triangle pattern on the gaming table layout. The players may discard from none to five unwanted cards. The dealer turns up the community cards and pre-designated groups of cards from the community cards are used for each player to make a complete five card poker hand. The dealer determines the best hand each player has made according to poker hand rankings. All winning hands will be paid by the dealer according to the odds listed in the pay table. When the progressive jackpot payout is used, the dealer examines the six community cards to determine if one of the predetermined card arrangements has occurred. Any winning payouts from the progressive jackpot are distributed to the players at the table. The method may also be played as a player banked game or as a pot game.

U.S. Pat. No. 5,531,448 describes a casino table poker game where a dealer deals three cards to each player. The dealer then deals eight cards as the community cards which are arranged in groups of two each on the gaming table layout. The card layout is in the format of a directional compass with two cards each at the North position, East position, South position and West position, respectively. At the North position, both cards are face down. At the East and West positions, one card is face down and one card is face up. At the South position, both cards are face up. Each player determines which one of the four two-card groups the player wishes to use to comprise his five card. The player identifies this selection by moving his wager to the corresponding compass location on the player's betting spot on the gaming table layout in front of the player. The dealer turns up the remaining community cards and the dealer determines the best hand each player has made according to poker hand rankings. All winning hands will be paid according to the odds listed in the pay table. When the progressive jackpot bonus payout is used, the dealer examines the eight cards of the community cards to determine if one of the predetermined card arrangements has occurred. Any winning payouts from the progressive bonus jackpot are distributed to the players at the table. Other versions of the invention use different community card arrangements and different numbers of community cards.

U.S. Pat. No. 5,762,340 describes the play of a casino table poker game comprising the steps of:

providing a plurality of players with the option of placing initial wagers and indicating which one of a plurality of poker games each of the players desire to play wherein different poker games require different numbers of cards in order to complete a hand;

the dealer providing cards to a plurality of players and to the dealer, each player and the dealer receiving only one hand of cards, wherein a first player receives a first predetermined number of cards to complete a first poker hand and a second player receives a second predetermined number of cards, wherein the number of cards in the second hand is different from the number of cards in the first hand, to complete a second poker hand. The first predetermined number may be five and the second predetermined number may be seven.

It is always desirable to explore alternative games for play in the field of gaming tables to provide players with varied experiences and alternatives to known games.

SUMMARY OF THE INVENTION

The described methods and apparatus are an enhancement to a game of poker that may be performed as live casino operated tables, games, video games, automated games with live players, or by having a dealer or banker provided with a casino table poker game.

A casino table poker game is played with poker hands of players competing against a poker hand of a dealer and/or against a pay table for achieving hands of predetermined rank. A player enters the game by placing at least an Ante for direct competition against the dealer. The player may also (optionally) place a Bonus Bet for the occurrence of a hand of at least a predetermined rank, the Bonus Bet being placed before the player has seen any of the cards dealt to the player. The player is dealt more cards than needed to form a poker hand, specifically the player being dealt 6 cards to make a final 5-Card poker hand. The dealer is also provided with more than the required number of cards, from which a number of cards are selected for the dealer's hand to play, with the dealer being dealt specifically seven cards from which to construct a best 5-Card poker hand. The player is provided with bonus payouts (e.g., multiple returns) on the Bonus Bet for ranked hands or a pair of Aces or better. The players' hands also compete directly against the rank of the dealer's hand if an additional play bet is placed to supplement the ante. The additional play bet is effectively an election to remain in play against the dealer's hand by making the additional play bet. The additional play bet may be varied by the player to be 1×, 2×, 3×, 4×, 5× or any multiple up to 25× the amount of the ante, or by house rules may be limited to a specific multiple or range of multiples of the Ante wager. Bonuses may be paid on both or each of the Bonus Bet and/or ante wager with unusually high ranking player's hands (such as a straight flush or four of a kind), whether or not the rank of the player's hand exceeds the rank of the dealer's hand. Pay tables may differ for ranked hands on the various wagers. That is a first pay table may be available for the Ante wager and a second pay table, which may and usually does have different odds, is available for the Bonus Bet. In one player-banked form of the game, there is no Bonus Bet, and the Ante and additional bets are combined by the dealer. Odds payouts are then made on the combined Ante/additional bet when the player's hand beats the dealer's hand.

DETAILED DESCRIPTION OF THE INVENTION

Figure 1:
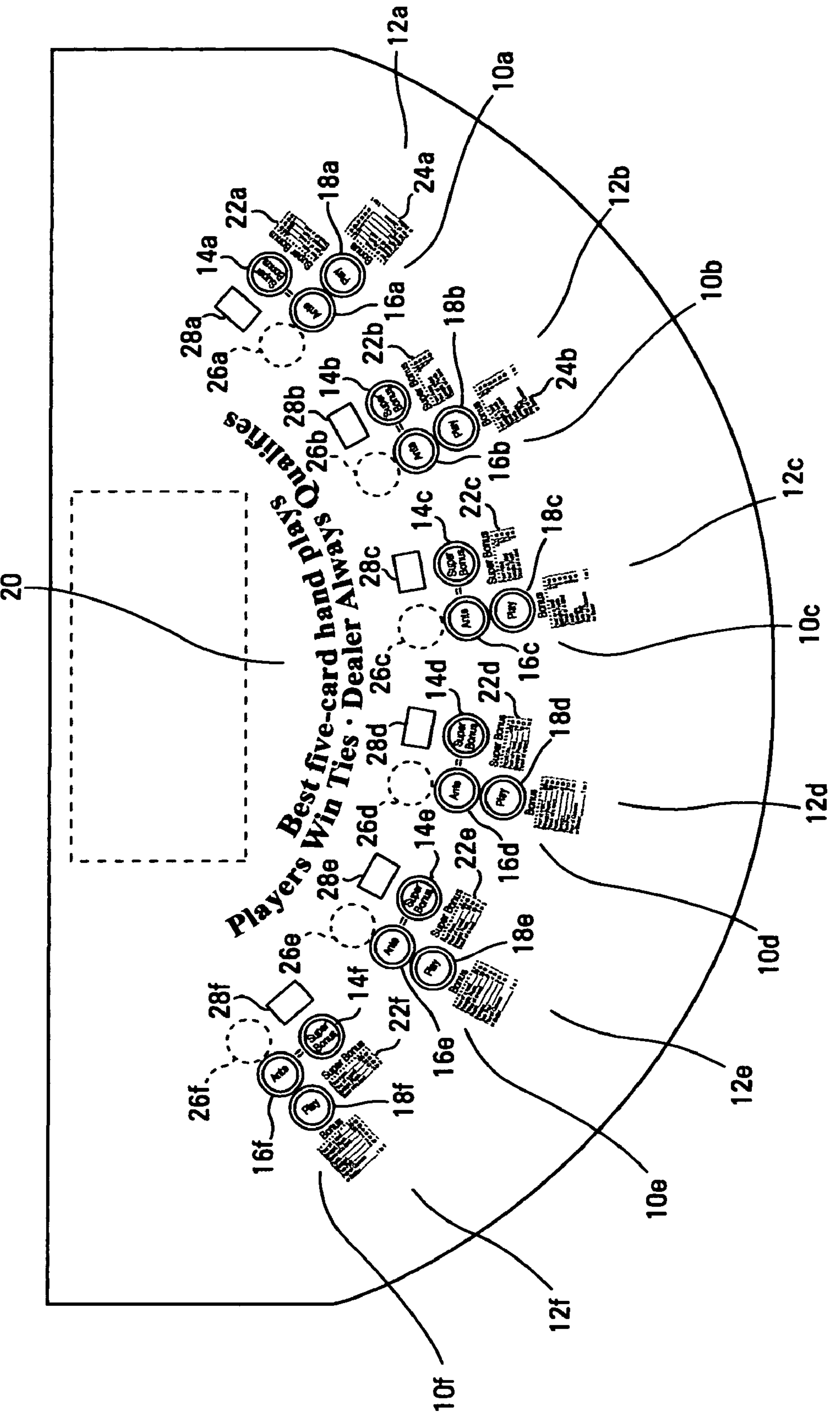
FIG. 1 is a plan view of a gaming table layout suitable for play of the game of the present invention.

A casino table card game is played on a table by at least one player and a dealer. The dealer usually represents the house or the casino in the play of the game. As shown in FIG. 1, wagering areas 10 are provided for each player, and card receiving areas 12 are available for each of the players and the dealer. The wagering area may include three distinct wagering zones for each player comprising a Bonus wager area 14 (e.g., the Bonus Bet wager), an Ante area 16, and a Bet area 18. To initiate play of the game, at least one (and usually only one) deck of standard or variant playing cards is provided. In other forms of the game, multiple intermixed decks of cards, decks with wild cards or special decks (i.e., decks with certain cards removed) are used. Each player who wishes to enter the play of the game makes at least one wager selected from the Bonus Bet 14 (or Bonus Bet) and the Ante 16. Typically, the Ante wager is a required wager and the Bonus Bet is an optional wager, and this would constitute one standard method of play. One or both of these wagers may be made. House rules may dictate that one or both bets are mandatory. The player may also play the hand blind (also referred to as the "House Way") by placing both an Ante and an additional Game Bet 18 (referred to in FIG. 1 as, the "Play Bet"). After placement of the at least one wager (and typically the Ante wager), each player who has made at least one wager is provided with a number of cards, preferably six cards, from which to select a best 5-Card poker hand. The cards may be dealt as a complete set of six cards into card receiving area 12 or in portions of one or more cards by the dealer, especially where an automatic shuffler and dealing machine is provided, or the game is played on a fully automated gaming table such as the Shuffle Master Table Master™ multi-player format gaming system. At about the same time, the dealer is dealt a number of cards exceeding five, and preferably specifically seven cards into dealer card area 20. In one example of the invention, seven cards are dealt to the dealer, before or after the cards are dealt to the player. One or more additional cards can be dealt to the player, the dealer or both after the initial cards are dealt to form a final total of cards. The final total may be the six (player cards) or seven (dealer cards) previously identified. One or more of the player cards can also be dealt as common or community card, and a community card may even be used by the dealer. Specific ranks of community cards may become community cards for a player, for a dealer, or for both a player and a dealer. For example, a player might receive five cards in his hand and one card in a community card-designated area on the layout. Each player plays with is or her best 5-Card hand formed from the five-cards in the player's hand and the community card. If the community card is a specific rank (e.g., less than a rank of 6, that card may be allowed to be used by the dealer in forming a hand, even in addition to the cards dealt to the dealer, or may be available to the dealer under any circumstance. Or the player plays with the best five cards, regardless of whether the hand includes one or more community cards.

In a player-banked version, one of the players is the banker and all other players play against the player-banker's hand as if that player were the dealer in a standard casino table game. The dealer's hand of cards is the banker hand, and the banker may or may not have cards in his/her playing area while that player banks the game. The banker banks the game with or without backup from another player or a commercial banker.

Although in one example of the invention the dealer receives one more card than each player, the number of cards dealt to each hand can be equal. What may be needed in one embodiment of the invention is that enough cards are dealt so that at least one discard can be made.

A "player-banked" game operates with essentially the same rules as a standard casino table game, but a player is randomly selected then elects or is elected to bank payments in a round of play, as if the player were the house. Various methods are used by casinos to choose a banker, including random selection, previous immediate winners, and taking turns in order. For example, when a game is offered in a California card room, players bank the game. In order for players to feel they can afford to bank a particular game, the payout odds must be kept low enough to prevent players from avoiding their turn banking the game. The higher bonus payouts or jackpots are therefore preferably eliminated in player-banked versions of the invention. Higher payout odds are acceptable in a more traditional Las Vegas style casino where the house banks the game. Jackpot or super-bonus payouts are therefore usually eliminated in player-banked games, or separate wagers of the jackpot type may be funded by side wagers to the house or to a progressive jackpot.

In the player-banked version, the game is played as a method of playing a player-banked poker-type card game. Each player in the game and a banker places at least one ante wager to participate in the game. In one form of the game, a five card poker hand is played. The players are dealt six cards (some of which may be community cards) and the banker receives seven cards. The player reviews the six cards received at that player position and determines what best five-card poker hand can be made from the six cards. If the player believes that the cards cannot form a five-card poker rank of sufficiently high rank to warrant competition against the dealer's hand (even without that hand or any portion of that hand having been displayed), the player may fold the hand, refusing to place an additional wager. At this time or usually a later time, the Ante would be collected by the dealer. In one example of the invention, if the player made the Bonus Bet and the Ante bet and decides to fold, the Bonus Bet is swept along with the Ante. In another form of the invention, if the player remains in the game by making the Play Bet and the player's hand does not contain a hand ranking of a pair of Aces or higher, and a bet was made on the Bonus Bet wager, that wager may be now or later collected by the dealer.

If the player determines that the rank of the best five-card poker hand that can be made from the six cards dealt to the player is sufficiently high as to warrant competition against the dealer (or if the player wants to 'bluff' against the dealer, particularly if the dealer must qualify), the player makes an additional wager, referred to as a play bet or game bet. That additional wager may be multiples of the Ante, such as 1×, 2×, 3×, 4×, 5× up to 25× the amount of the original Ante, at the option of the player and as defined by house rules. A preferred range is from 1× to 20× the Ante wage for the range of the play bet. House rules may dictate the ranges of multiples that can be bet. For example, on high stakes tables, the house may allow higher multiples, while at lower stakes tables, smaller ranges of multiples may be permitted.

In some examples of the invention, the game bet is limited to a specific amount or a specific range such as 1× or 1× to 5× the ante unless the player has a qualifying hand of at least a predetermined rank, such as a pair of kings or better, for example. If the player's hand qualifies he has the option of increasing his bet. Fractional amounts or larger amounts may be allowed, but they can complicate the payout or alter the hold for the house, so those changes are in the discretion of the casino. After discarding excess cards and placing the Game Bet, or placing the sixth card face down, or merely leaving the sixth card in the player hand so that the hand may be arranged and ranked by the dealer or player when exposed, the player's hand is placed on the table for display. The dealer's hand is then revealed after each and every player has determined whether or not the Game Bet is to be made. The dealer compares the value or rank of his hand against the value or rank of each player's hand, usually in succession around the table, and each series of wagers (the Bonus Bet wager, the Ante and the Game Bet) is resolved. Ties on the rank of player's hands and dealers hands may be paid to the player, called a push, or collected by the dealer, depending upon the desired house advantage the casino wants to build into the game. The dealer may either always qualify (a preferred method of play as shown in FIG. 1), or a level of qualification may be built into the game (such as at least Queen high, at least King high, at least Queen-Jack, At least King-Jack, at least Ace-King, or at least one pair).

Resolution on the wagers may be based upon pay tables 22 for the Bonus Bet wager, pay tables on the Ante (not shown), and/or the Game Bet 24. One preferred play of the game provides pay tables for one or more of the Bonus Bet wager 22, the Ante 24 and an automatic bonus payout on the ante (not shown). The Game Bet and/or the Ante wager typically pays at least or exactly one-to-one with a player win, but pay tables may be established within a range of discretion of the casino, varying amount depending upon the percentage take desired to be built into the game while still providing excitement and stimulation for the player. This differentiation is based upon the fact that with certain very high ranking hands, the player would be at an extreme advantage in placing a 5× Game Bet, assuring a very high multiple payout, with essentially no risk or little risk involved in the placement of the 5× Game Bet wager. The payout of wagers may be tailored by the casino by selecting pay tables designed for greater player payouts or greater casino earnings.

Although a five card poker game is one form of the invention, the game could also be played with different numbers of cards, with different numbers of cards in players' and dealer's hands and different numbers and rules for community cards. There would usually be necessary adjustments to the pay tables.

For example, in a five card game, the hierarchy of hands is as follows:

Straight Flush
Four of a Kind
Full House
Flush
Straight
Three of a Kind
Two Pair
Pair
High Card A different number of cards in the card game or a different number of decks might require a different hierarchy of hand rankings.

There are many variations of the game that may be played within the scope of the present invention. The following variations on the format described above shall be described in a manner that should enable those skilled in the art to appreciate the expanded scope of play available, rather than considering any single described method as limiting the intended scope of the game.

Version I—Best 5 of 6 Cards, No Qualification, Dealer Gets Extra Card

Each player receives 6 cards, and the dealer/banker receives 7 cards. The players and the dealer/banker identify their best five card poker hands. The players may rely upon the house for assistance, if needed. The dealer/banker always qualifies, that is, the dealer's/banker's hand and any players' hands are always in play if the Ante bet is made and the player makes a subsequent Play wager. Players have the choice of placing one or both of the Ante Bet and a Bonus Bet (e.g., the Bonus Bet wager). House rules may require the player to make the Ante Bet, the Bonus Bet, or both the Ante and Bonus Bet. The Ante wager is a wager played directly against the rank of the dealer's hand, and the Bonus Bet is a bet against a pay table. If after viewing his/her hand, a player chooses to stay in the game against the dealer/banker (keeping the Ante wager in play), the player must make an additional Game Bet to stay in the game. This Game Bet may be, for example, between 1 and 25 (or between 1 and 4, or between 1 and 3) times the amount of the initial Ante wager at the option of the player. In other forms of the game, the player's Game Bet must be 1× the ante unless the player holds a predetermined qualifying hand, such as a pair of Aces or better. If the player has a qualifying hand, he can bet up to 25× the Ante. Preferably, the player must hold a pair of aces or better to win on the Bonus Bet (hence the name 'Bonus Bet'). The Bonus Bet preferably pays a maximum return of 50:1, but payouts may theoretically be as high as 500:1 or 2000:1 for certain hands, such as for a Royal Flush. The Bonus Bet side bet game may or may not be present in the rules of the game. In this example of the invention, the game pays an automatic bonus for certain high ranking hands according to a payout schedule. This bonus is paid on the Ante wager, and does not require the player to make a separate bet to qualify for this payout, although the Play wager or Game Bet must be made to stay in the game. For example, automatic bonuses are paid on three of a kind, full houses, flushes, straights, straight flushes and four of a kind. The automatic bonus could also be paid on the Game Bet or the sum of the Ante and Play bets.

Version II—Best 5 of 6 Cards, Dealer Must Initially Qualify or Redraw

Each player and the dealer/banker gets six cards to make the best five-card poker hand. If the dealer's/banker's hand does not equal or exceed a certain rank (e.g., a pair of 2's, pair of 6's, pair of 7's, etc. or better), the rules may be designed so that the dealer must discard all cards and draws a new seven card hand, and then makes a five-card poker hand from the seven cards. Otherwise, the dealer plays with the original best seven of five cards dealt. The player must make the Ante wager to be in the game against the dealer. After redrawing, and when redrawing is not required, the dealer/banker always qualifies to play against the player. It is possible to allow the player or require the player to make the Ante wager 1) before the deal of cards, 2) after the deal of cards but before any cards are revealed, 3) after the deal of cards and after the player has reviewed his cards but before the dealer/banker has exposed cards, 4) after the deal of cards and a partial or complete revelation of the dealer's/banker's seven cards (but before review of the player's cards), or 5) after the deal of cards and a review of the players' cards and a partial revelation or complete revelation of the dealer's/banker's five cards, which play might be restricted to where the dealer/banker has not qualified (but not after revelation of any seventh card). The player's hand may be required to exceed a minimum rank to bet more than 1× the Ante. For example, if the player has a qualifying hand of a pair of Kings or better, the player can make a Game Bet of 1×, 2×, 3× or 25× the Ante. As with Version I, the rules can provide that the Ante bet is mandatory and the Bonus bet is optional, the Bonus Bet (side bet) is mandatory and the Ante Bet is optional, or both initial bets (the Ante and the Bonus Bet) are mandatory. The automatic bonus against a pay table on the Ante bet may or may not be present in the rules of the game. The Bonus Bet game may or may not be present, also in the rules of the game. In this example, a pair of aces or better qualifies the player for a Bonus Bet payout of 1:1. The automatic bonus pays even if the player's hand is lower in rank than the dealer's/banker's hand.

Version III—Dealer and Player's Make Best 5 of 6 Card Hand, Dealer Must Qualify to Play The players receive six cards and the dealer/banker receives seven cards to make their best four-card poker hand. The betting/wagering rules and procedures are the same as in the previous versions, except for those listed below. Either the Ante is mandatory, the Ante or the Bonus Bet is mandatory, or both initial wagers are mandatory. The dealer/banker must qualify to play (for example, with a hand of Ace-King high or better, King-Queen or higher, pair of deuces or higher, etc.). The automatic bonus side bet game against a pay table is present in the rules of this example of the game, although such side bets and bonuses are often excluded from player-banked games and could be excluded here. Pay table adjustments may or may not be made when excluding the side bet and bonus wagers.

If the player stays in the game, the player can bet between 1× to 25× the Ante if the player has a qualifying hand of a pair of Kings or better. Otherwise, the maximum Game Bet may be, but is not required to be, limited to 1× the Ante. The lowest ranking hand that qualifies for the bonus payout is selected in advance of the placement of all wagers and bets, and may be a pair of Aces or better, for example.

Version IV—Five Card Poker with Super Bonus

The dealer/banker is dealt seven cards and each player is dealt six cards each. The cards are used to make the best five card poker hand by the players and the dealer/banker. The hands are ranked according to the following four card poker ranking schedule:

- Straight Flush
- Four of a Kind
- Full House
- Flush
- Straight
- Three of a Kind
- Two Pair
- Pair
- High Card Players can make a bet against the dealer/banker (Ante), a bet against the pay table (Bonus Bet Bonus Bet) or both. House rules may require one or both bets to be mandatory. In addition, the players may or may not be required to make a Super Bonus bet in an amount equal to or unequal to the amount of the Ante in this example of the invention. In one form of the invention, the Super Bonus bet 26 is mandatory and is at least equal in value to the Ante.

Players place equal bets on the Ante and/or Super Bonus and/or Bonus spots on the layout. After viewing the cards, the player must fold or place an additional Bet (play wager). If the player's hand does not qualify with a pair of Kings or better (or whatever predetermined rank is designed into the game), the player must bet 1× the ante to remain in the game. With a qualifying hand of a pair of Kings or better, he can bet an amount equal to or multiples of the Ante, such as 1×, 2× or 3× the Ante, up to the approximate limit of 25× (or less or more) described herein.

If the player has a higher ranking hand than the dealer's/banker's hand, the player is paid 1:1 on the ante and the play bet. If the dealer's/banker's hand outranks the player's hand, the player loses the ante and the play bet.

The player has the option (or may be required) at the beginning of the game to place a Bonus Bet. In this example of the invention, the player wins a bonus payout for a pair of Aces or better, according to the pay table 22. If the player makes the Ante and Play bets and beats the dealer/banker, but does not have a pair of Aces or better, the player pushes on the bonus bet. The player is always paid on the Bonus Bet bonus bet, regardless of whether or not the player's hand beats the dealer's/banker's hand.

In addition, this example of the invention includes a mandatory Super Bonus bet 26 that is made in an amount equal to the ante 16. The player wins a payout for certain high ranking hands such as a straight flush or four of a kind. A pay table 28 is provided on the layout to identify winning hands and payout amounts. These Super Bonus bets are not typical of player-banked games and may be excluded or may be within the award/play province of the house, card-room, State, commission or the like, and not be controlled by the player/banker.

A failure to obtain a "Super Bonus" hand may or may not result in an automatic loss of the bet. For example, when the player's hand against the dealer/banker does not qualify with a pair of kings or a straight flush or better, but the hand still beats the dealer/banker, the Super Bonus bet pushes. But, if the player folds on the ante or loses the ante and play bets against the dealer/banker, the Super Bonus bet is also lost.

The Super Bonus bet is desirable in some instances where it is desired to provide the house or the card room with more of an advantage. In this example of the game, removing the mandatory Super Bonus bet causes the game to favor the player. However, other rule changes such as requiring the dealer/banker to qualify, or raising the minimum qualification hand ranking when making the play bet are other means to shift the odds to favor the house.

Version V—Player Banked Card Room 5-Card Poker Game

This game is a simplified version of traditional Five Card Poker. First, the "Aces Up" bonus bet is eliminated to reduce volatility in the game. The game must be less volatile in order to encourage the players to bank the game. If the banker chooses to bank only to a certain amount, a syndicate banker may back up the hand. If no player wishes to bank the hand, the syndicate banker may act as banker.

The house is compensated by taking a percentage of the amounts wagered, a fixed fee per round or a fee per unit of time. Most commonly the house takes a percentage of amounts wagered.

The dealer holds and manages the banker's hand. When the banker is banking the game, all moneys lost go to the banker, and all monies won are paid by the banker. If the banker's funds are limited and cannot cover all the action, the bets that are not covered are returned to the player, or are backed by a back-up banker, which is typically a syndicate banker, but could be another player. Alternately, the syndicate banker may bank the entire game. The order in which the players are permitted to bank the game is determined by the house. Typically the player position is randomly selected and then players are selected in clockwise or counterclockwise order in future rounds.

As with the traditional game players receive six cards to make a best five card poker hand and the dealer/banker receives a seven card hand to make the best five-card poker hand. The player must make a play wager to stay in the game. The play wager is 1× to 3× the Ante wager (or any other allowed range), at the option of the player. Higher multiples of the Ante may be played such as 4× or 25× the Ante, although player backed games would not be likely to have such higher wagers allowed. If the player chooses not to stay in the game, the player folds and loses the Ante wager. There is no player qualification to increase the bet above 1× the Ante.

In this form of the game, once the Play wager is made, the dealer stacks the Play and Ante wagers and the wager becomes one single wager. Merging the wagers into a single wager simplifies resolution of the wager for the dealer. There is no dealer or player minimum qualifying hand in this form of the game.

Whenever the player's hand outranks the banker's hand, the player wins on the bets that are in action. If the rank of the player and dealer's hand is the same, players win. The typical payout is 1:1 on the Ante/Bet combination but there are exceptions. For certain high-ranking hands, higher odds payouts are paid on the Ante/Bet combination, rather than 1:1 odds. Higher payout odds are only paid if the player hand beats the dealer hand. For example, if a player has a four of a kind (of 3's), while the dealer has a four of a kind (of 2's), the player wins, for example, 5:1 on the Ante and Play wagers.

An exemplary series of pay tables for this form of the game is shown below:

Format I

| HAND | SUPER BONUS | PLAY BET |
|---|---|---|
| Royal Flush | 200 to 1 | 1x to 20x |
| Straight Flush | 50 to 1 | 1x to 20x |
| Four of a kind | 20 to 1 | 1x to 10x |
| Full House | 10 to 1 | 1x to 10x |
| Flush | 6 to 1 | 1x to 6x |
| Straight | 5 to 1 | 1x to 5x |
| 3 of a kind | 3 to 1 | 1x to 4x |
| Two pair | 1 to 1 | 1x to 3x |
| All other hands | Push* | 1x to 2x |
| Average Bet: | 3.31 units | |
| House Edge | 1.22% | |

If Player beats or ties dealer

Format II

| HAND | SUPER BONUS | PLAY BET |
|---|---|---|
| Royal Flush | 200 to 1 | 1x to 8x |
| Straight Flush | 50 to 1 | 1x to 8x |
| Four of a kind | 20 to 1 | 1x to 8x |
| Full House | 10 to 1 | 1x to 6x |
| Flush | 5 to 1 | 1x to 6x |
| Straight | 4 to 1 | 1x to 5x |
| 3 of a kind | 3 to 1 | 1x to 5x |
| Two pair | 1 to 1 | 1x to 3x |
| All other hands | Push* | 1x to 2x |
| Average Bet: | 3.35 units | |
| House Edge | 1.22% | |

If Player beats or ties dealer

Format III

| HAND | SUPER BONUS | PLAY BET |
|---|---|---|
| Royal Flush | 200 to 1 | 1x to 20x |
| Straight Flush | 100 to 1 | 1x to 20x |
| Four of a kind | 20 to 1 | 1x to 10x |
| Full House | 10 to 1 | 1x to 10x |
| Flush | 6 to 1 | 1x to 6x |
| Flush | 6 to 1 | 1x to 6x |
| Straight | 5 to 1 | 1x to 5x |
| 3 of a kind | 3 to 1 | 1x to 4x |
| Two pair | 1 to 1 | 1x to 3x |
| All other hands | Push* | 1x to 2x |
| Average Bet: | 3.31 units | |
| House Edge | 1.10% | |

*If Player beats or ties dealer

As can be seen from these percentages in the House Edge, with perfect play the Player can play for extended periods of time and engage in a casino table game with one of the lower house edges for a casino table game.

Automatic bonuses may or may not be part of the game. Automatic bonuses may be paid on the Ante/Bet or on the Ante, or on the Bet only for certain high ranking hands. For example a 4 of a kind, a straight flush and a full house could pay automatic bonus odds payouts. Corresponding odds payouts are paid and are typically shown on a pay table printed on the layout.

The play of the game may be completed manually on a non-electronic game table, with the dealer using a physical deck(s) of cards, visually identifying the amounts and positions of wagers, manually collecting and paying out wagers, etc. It is possible to incorporate some degree or nearly an entire electronic system into the game table or into the play of the game. Such partial or complete electronic systems may perform such tasks as identifying the existence of a wager (e.g., U.S. Pat. Nos. 6,229,534; 5,337,973; and 5,377,994), or may provide virtual cards from an electronically stored deck of cards (e.g., U.S. Pat. Nos. 5,255,915; and 5,897,436). The games of the present invention could also be executed on a multiple player gaming platform including a simulated virtual dealer, such as the device and system described in U.S. patent application Ser. No. 09/179,748, filed Oct. 28, 1998, now U.S. Pat. No. 6,607,443 and U.S. patent applications Ser. Nos. 10/764,995; 10/764,994; and 10/764,827, each filed on Jan. 26, 2004. The content of these and every patent specification and application specification is hereby and herein incorporated by reference.

The games of the present invention may be implemented as live table games, television or cable game show games, video poker gaming machine platforms, hand-held games for play, multiple player interactive wagering platform games (with kiosk formats, single player screens, community screens, and/or banks of seats for players with a common dealer screen), cell phone games, games downloadable from the internet, parlor games, games executed on personal computers, palm pilots, play stations and the like. Each of the above game applications is contemplated by the present invention.

A gaming system that can be used to practice the method of the present invention comprises a table and a dealer "virtual" video display system positioned for view by players seated at the table. The table may seat at least two players up to the amount of players that can be configured about the table and have a view of the dealer video display system. Typically each gaming system will have at least four player available positions, with space determinations considered as to whether there would be 4, 5, 6 or 7 player positions. It is possible to have a completely circular dealer display (e.g., holographic display in a cylindrical centerpiece) and have players distributed around the entire periphery, but this is too dissimilar to standard play arrangements and could slow the game down, as play should approximate that of a live game, with players playing in sequence. A surface of the table will include a generally continuous display surface for showing all player hands, community cards, dealer hands and any other cards used to play the game for any purpose, and, where there are touch screen player controls, for displaying the player touch screen controls. A majority of the table surface comprises a video monitor in one example of the invention. Where there are no touch screen controls, the table surface may include player control panels at each player station near the continuous display surface. The use of a continuous display surface offers some significant advantages in simulating or recreating a standard card table surface. Cards may be readily viewed by other players at a table, which is standard in table games and adds to player enjoyment. Individual monitors, especially where slanted towards the individual players make such table-wide card reading difficult. The use of the full screen (continuous) display also allows for better animation to be provided, such as displaying virtual images of cards moving to the player and "virtual" chips being placed on the table when wagers are indicated. For purposes of this disclosure, the term "virtual" means a graphical video representation of a real object or person, such as a dealer, cards and chips, for example.

The individual player positions preferably have a separate intelligence at each player position that accepts player input and communicates directly with a game engine (main game computer or processor). The intelligence is preferably an intelligent board that can process information. For purposes of this disclosure the term "intelligent" refers to the ability to execute code, either provided in the form of software or hardware circuits. Such processing may at least comprise some of signal converting (e.g., signals from player card readers, credit deposit, currency readers, coin readers, touch screen signals, control panel signals) into a signal that can be included in an information packet and interpreted by the main game computer when the signal is sent. Communication between the intelligence at each player position is direct to the main game computer and may be by self-initiated signal sending, sequenced polling by the main game computer (e.g., each position communicates directly to the main game computer in turn), timed communication, or any other order of communication that is direct between the intelligence and the main game computer.

One preferred form of communication between the main game computer and player station computers is by means of self-initiated signal sending. There is essentially a single main game computer that contains video display controls and programs for both the dealer display and the table top display, audio controls and programs, game rules (including storage of multiple games if intended to be available on the machine), random number generator, graphic images, game sequence controls, security systems, wager accounting programs, external signaling and audit functions, and the like. In other forms of the invention, the above functions are divided between a main processor and one or more additional processors. The intelligence at each player position speeds up the performance of all aspects of the game by being able to communicate directly with the main game computer and being able to process information at the player position rather than merely forwarding the information in raw form to the main game computer. Processing player information at player positions frees up resources for use by the main processor or processors.

A card game system may also include a suitable data and control processing subsystem that is largely contained within a main control module supported beneath the tabletop. The control and data processing subsystem includes a suitable power supply for converting alternating current from the power main as controlled by a main power switch. The power supply transforms the alternating line current to a suitable voltage and to a direct current supply. Power is supplied to a power distribution and sensor/activity electronics control circuit. Commercially available power switching and control circuits may be provided in the form of a circuit board which is detachable, and plugs into a board receptacle of a computer mother board or an expansion slot board receptacle. A main game controller motherboard may include a central microprocessor and related components well-known in the industry as computers using Intel brand Pentium® microprocessors and related memory or intelligence from any other manufacturing source. A variety of different configurations and types of memory devices can be connected to the motherboard as is well known in the art. Of particular interest is the inclusion of two flat panel display control boards connected in expansion slots of the motherboard. Display control boards are each capable of controlling the images displayed for the dealer video display and for each of the player position display areas on the continuous display screen on the table and other operational parameters of the video displays used in the gaming system. More specifically, the display control boards are connected to player bet interfaces circuits for the player stations. This arrangement also allows the display control boards to provide necessary image display data to the display electronic drive circuits associated with the dealing event program displays and the dealer display.

The motherboard and/or the individual player intelligent boards also includes a serial port that allows stored data to be downloaded from the motherboard to a central casino computer or other additional storage device. In one example, each player board communicates directly with the casino computer system. This allows card game action data to be analyzed in various ways using added detail, or by providing integration with data from multiple tables so that cheating schemes can be identified and eliminated, and player tracking can be maintained. Player performance and/or skill can be tracked at one table or as a compilation from gaming at multiple tables, as by using Bloodhound™ security software marketed by Shuffle Master, Inc., which may be incorporated into this automated gaming system. Additionally, player hand analysis can be performed. The motherboard and/or individual player intelligent boards may also have a keyboard connection port that can be used to connect a larger format keyboard to the system to facilitate programming and servicing of the system.

Although the preferred system shown does not require features illustrated for receiving automated player identification information, such features can alternatively be provided. Card readers such as used with credit cards, or other identification code reading devices can be added in the system to allow or require player identification in connection with play of the card game and associated recording of game action by one of the processors. Such a user identification interface, for example a card reader located at each player station, can be implemented in the form of a variety of magnetic card readers commercially available for reading user-specific identification information. The user-specific information can be provided on specially constructed magnetic cards issued by a casino, or magnetically coded credit cards or debit cards frequently used with national credit organizations such as VISA, MASTERCARD, AMERICAN EXPRESS, casino player card registry, banks and other institutions. The information could also be provided on other writable media, such as an RFID chip with writable memory, or bar coding, as just a few examples.

Alternatively, it is possible to use so-called smart cards to provide added processing or data storage functions in addition to mere identification data. For example, the user identification could include coding for available credit amounts purchased from a casino. As further example, the identification card or other user-specific instrument may include specially coded data indicating security information such as would allow accessing or identifying stored security information which must be confirmed by the user after scanning the user identification card through a card reader. Such security information might include such things as file access numbers which allow the central processor to access a stored security clearance code which the user must indicate using input options provided on displays using touch screen displays. A still further possibility is to have participant identification using a fingerprint image, eye blood vessel image reader, or other suitable biological information to confirm identity of the user that can be built into the table. Still further it is possible to provide such participant identification information by having the pit personnel manually code in the information in response to the player indicating his or her code name or real name. Such additional identification could also be used to confirm credit use of a smart card or transponder. All or part of the functions dedicated to a particular player station are controlled by the player station intelligence in one form of the invention. Additionally, each player station intelligence may be in communication with a casino accounting system.

It should also be understood that the continuous screen can alternatively be provided with suitable display cowlings or covers that can be used to shield display of card images from viewing by anyone other than the player in games where that is desirable. This shielding can also be effected by having light-orientation elements in the panel, and some of these light-orientation elements are electronically controllable. In this manner, the processor can allow general viewing of cards in games where that is desirable or tolerated, and then alter the screen where desired. These types of features can be provided by nanometer, micrometer or other small particulate or flake elements within a panel on the viewing area that are reoriented by signals from the processor. Alternatively, liquid crystal or photo chromatic displays can be used to create a screening effect that would allow only viewers at specific angles of view from the screen area to view the images of cards. Such an alternative construction may be desired in systems designed for card games different from blackjack, where some or all of the player or dealer cards are not presented for viewing by other participants or onlookers. Such display covers or cowlings can be in various shapes and configurations as needed to prevent viewing access. It may alternatively be acceptable to use a player-controlled switch that allows the display to be momentarily viewed and then turned off. The display can be shielded using a cover or merely by using the player's hands. Still further it is possible to use a touch screen display that would be controlled by touch to turn on and turn off. Similar shielding can be used to prevent others from viewing the display.

A review of the figures will assist in a further understanding of the invention.

Figure 2:
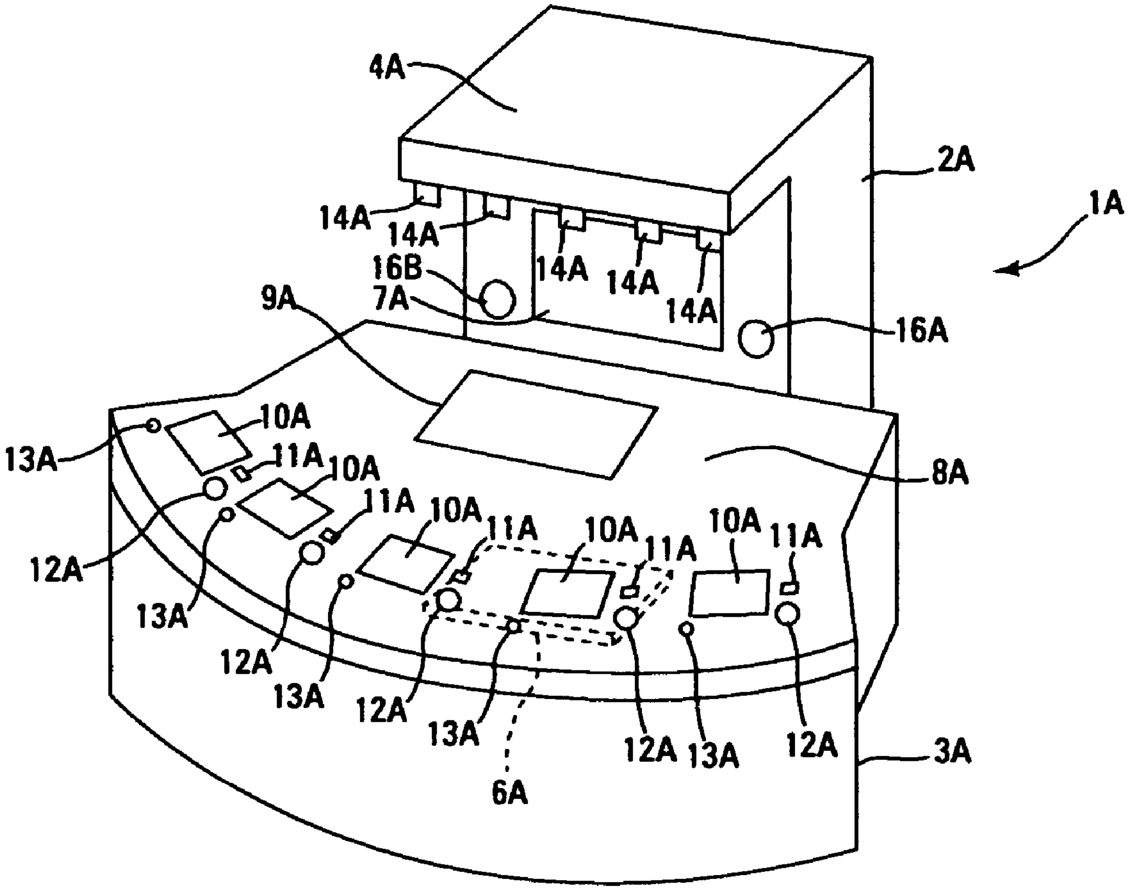
Fig. 2 Prior Art
FIG. 2 shows a perspective view of a prior art format for an automated gaming system.

FIG. 2 shows a fully automated gaming table 1A of the prior art, as disclosed in U.S. Patent Application 2003/0199316. The system 1A comprises a vertical upright display cabinet 2A and a player bank or station cluster arrangement 3A. The vertical display cabinet 2A has a viewing screen 7A on which images of the virtual dealer are displayed. The top 8A of the player bank arrangement 3A has individual monitor screens 10A for each player position, as well and tabletop inserted coin acceptors 11A, and player controls 12A and 13A. There is a separate and larger dealer's hand screen 9A on which dealer cards are displayed in a format large enough for all players to view. Speakers 16A and 16B are provided for sound transmission and decorative lights 14 are provided.

Figure 3:
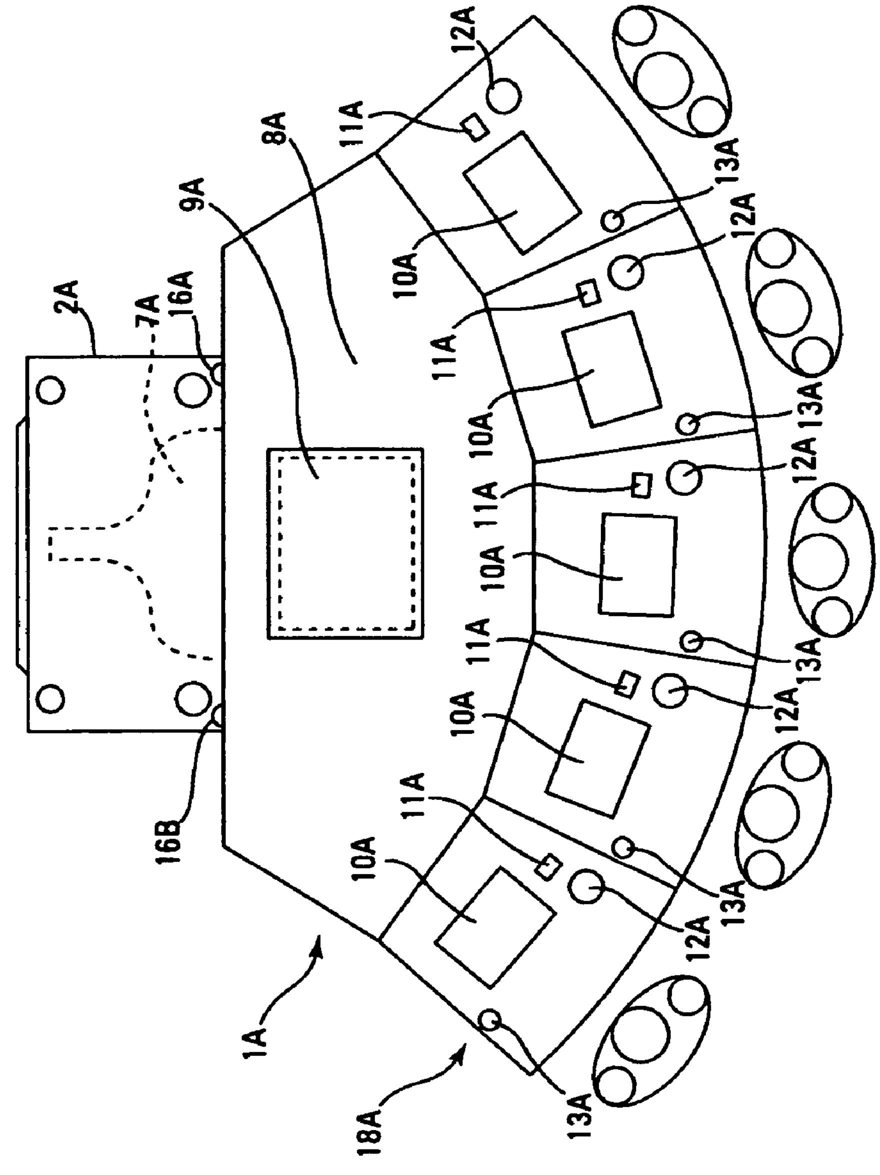
Fig. 3 Prior Art
FIG. 3 shows an overhead view of a prior art format for an automated gaming system.
Figure 4:
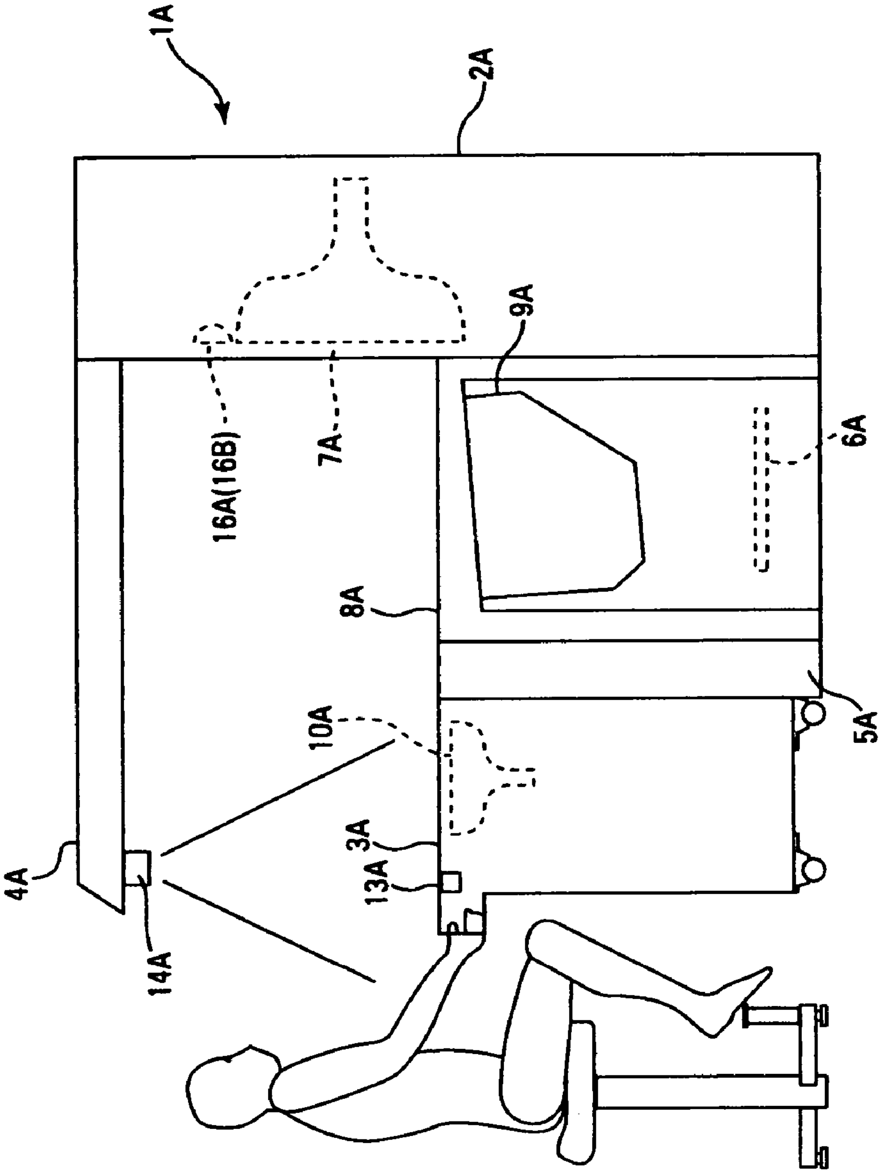
Fig. 4 Prior Art
FIG. 4 shows a side view of a prior art format for an automated gaming system.

FIG. 3 shows an overhead view of the same prior art automated gaming system 1A with the viewing screen 7A shown more clearly as a CRT monitor. It can also be seen that each player position has to form an arc cut into the semicircular player seating area 18A. FIG. 4 shows a side view of the same prior art automated gaming system of FIGS. 2 and 3 where the orientation of the three different types of CRT monitors 7A, 9A and 10A are shown.

Figure 5:
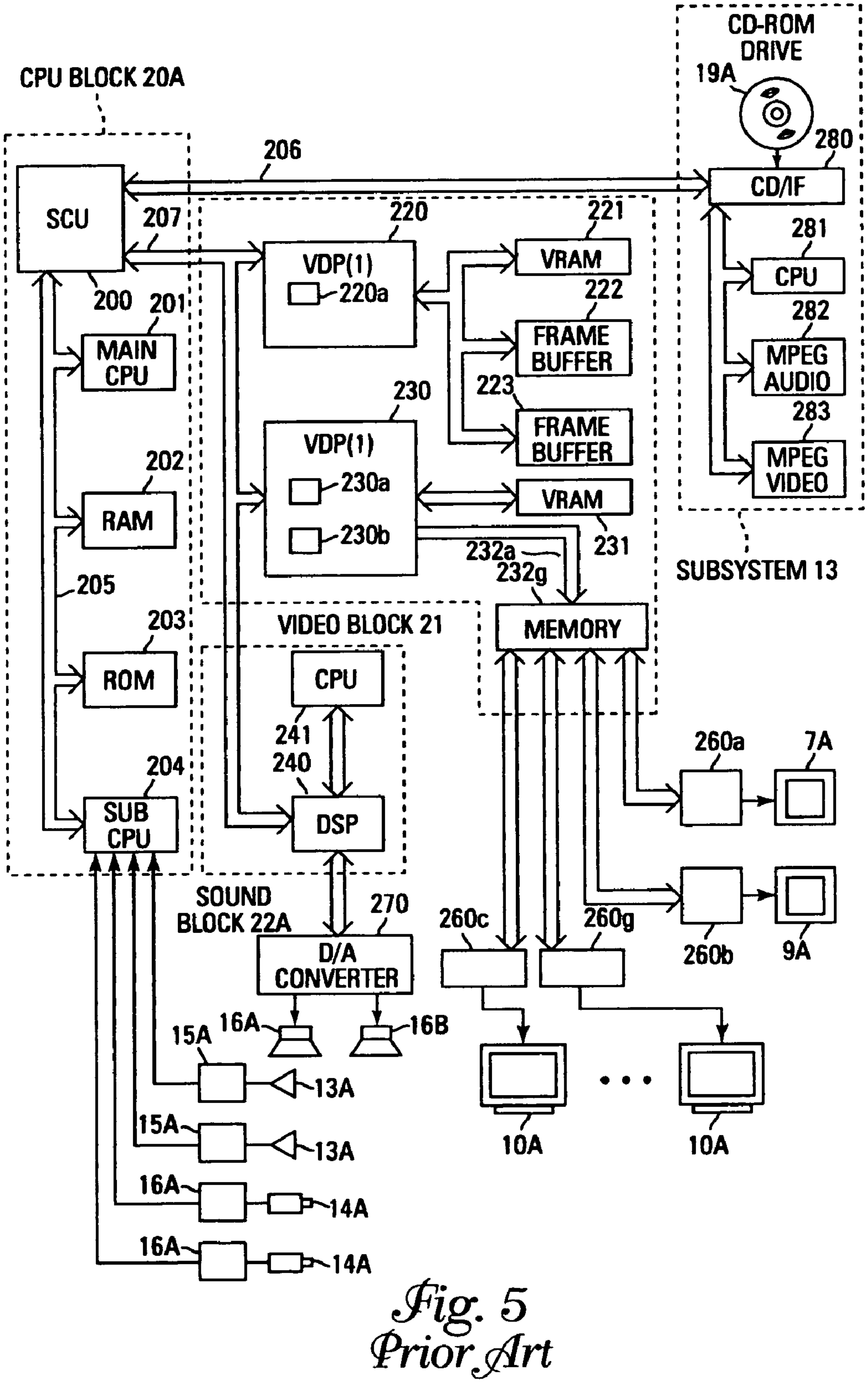
Fig. 5 Prior Art
FIG. 5 shows a block schematic of the electronic configuration of a prior art animated gaming system.

FIG. 5 shows the schematic circuitry of a prior art automated system as disclosed in 2003/0199316. FIG. 5 is a block diagram of processing circuitry in the game device of FIG. 2. The game device housing comprises a CPU block 20A for controlling the whole device, a picture block 21A for controlling the game screen display, a sound block 22A for producing effect sounds and the like, and a subsystem 19A for reading out CD-ROM.

The CPU block 20A comprises an SCU (System Control Unit) 200, a main CPU 201, RAM 202, RAM 203, a sub-CPU 204, and a CPU bus 205. The main CPU 201 contains a math function similar to a DSP (Digital Signal Processing) so that application software can be executed rapidly.

The RAM 202 is used as the work area for the main CPU 201. The RAM 203 stores the initialization program used for the initialization process. The SCU 200 controls the busses 205, 206 and 207 so that data can be exchanged smoothly among the VEPs 220 and 230, the DSP 241, and other components.

The SCU 200 contains a DMA controller, allowing data (polygon data) for character(s) in the game to be transferred to the VRAM in the picture block 21. This allows the game machine or other application software to be executed rapidly. The sub-CPU 204 is termed an SMPC (System Manager & Peripheral Control). Its functions include collecting sound recognition signals from the sound recognition circuit 15 or image recognition signals from the image recognition circuit 16 in response to requests from the main CPU 201. On the basis of sound recognition signals or image recognition signals provided by the sub-CPU 204, the main CPU 201 controls changes in the expression of the character(s) appearing on the game screen, or performs image control pertaining to game development, for example. The picture block 21 comprises a first VDP (Video Display Processor) 220 for rendering TV game polygon data characters and polygon screens overlaid on the background image, and a second VDP 230 for rendering scrolling background screens, performing image synthesis of polygon image data and scrolling image data based on priority (image priority order), performing clipping, and the like. The first VDP 220 houses a system register 220*a*, and is connected to the VRAM (DRAM) 221 and to two frame buffers 222 and 223. Data for rendering the polygons used to represent TV game characters and the like is sent to the first VDP 220 through the main CPU 220, and the rendering data written to the VRAM 221 is rendered in the form of 16- or 8-bit pixels to the rendering frame buffer 222 (or 223). The data in the rendered frame buffer 222 (or 223) is sent to the second VDP 230 during display mode. In this way, buffers 222 and 223 are used as frame buffers, providing a double buffer design for switching between rendering and display for each individual frame. Regarding information for controlling rendering, the first VDP 220 controls rendering and display in accordance with the instructions established in the system register 220*a* of the first VDP 220 by the main CPU 201 via the SCU 200.

The second VDP 230 houses a register 230*a* and color RAM 230*b*, and is connected to the VRAM 231. The second VDP 230 is connected via the bus 207 to the first VDP 220 and the SCU 200, and is connected to picture output terminals Voa through Vog through memories 232*a* through 232*g* and encoders 260*a* through 260*g*. The picture output terminals Voa through Vog are connected through cables to the display 7 and the satellite displays 10.

Scrolling screen data for the second VDP 230 is defined in the VRAM 231 and the color RAM 230*b* by the CPU 201 through the SCU 200. Information for-controlling image display is similarly defined in the second VDP 230. Data defined in the VRAM 231 is read out in accordance with the contents established in the register 230*a* by the second VDP 230, and serves as image data for the scrolling screens that portray the background for the character(s). Image data for each scrolling screen and image data of texture-mapped polygon data sent from the first VDP 220 is assigned display priority (priority) in accordance with the settings in the register 230*a,* and the final image screen data is synthesized.

Where the display image data is in palette format, the second VDP 230 reads out the color data defined in the color RAM 230*b* in accordance with the values thereof, and produces the display color data. Color data is produced for each display 7 and 9 and for each satellite display 10. Where display image data is in RGB format, the display image data is used as-is as display color data. The display color data is temporarily stored in memories 232*a*-232*f* and is then output to the encoders 260*a*-260*f.* The encoders 260*a*-260*f* produce picture signals by adding synchronizing signals to the image data, which is then sent via the picture output terminals Voa through Vog to the display 7 and the satellite displays 10. In this way, the images required to conduct an interactive game are displayed on the screens of the display 7 and the satellite displays 10.

The sound block 22A comprises a DSP 240 for performing sound synthesis using PCM format or FM format, and a CPU 241 for controlling the DSP 240. Sound data generated by the DSP 240 is converted into 2-channel sound signals by a D/A converter 270 and is then presented to audio output terminals Ao via interface 271. These audio output terminals Ao are connected to the input terminals of an audio amplification circuit. Thus, the sound signals presented to the audio output terminals Ao are input to the audio amplification circuit (not shown). Sound signals amplified by the audio amplification circuit drive the speakers 16A and 16B. The subsystem 23A comprises a CD-ROM drive 19*b,* a CD-I/F 280, and CPU 281, an MPEG-AUDIO section 282, and an MPEG-PICTURE section 283. The subsystem 23 has the function of reading application software provided in the form of a CD-ROM and reproducing the animation. The CD-ROM drive 19B reads out data from CD-ROM. The CPU 281 controls the CD-ROM drive 19B and performs error correction on the data read out by it. Data read from the CD-ROM is sent via the CD-I/F 280, bus 206, and SCU 200 to the main CPU 201 that uses it as the application software. The MPEG-AUDIO section 282 and the MPEG-PICTURE section 283 are used to expand data that has been compressed in MPEG (Motion Picture Expert Group) format. By using the MPEG-AUDIO section 282 and the MPEG-PICTURE section 283 to expand data that has been compressed in MPEG format, it is possible to reproduce motion picture. It should be noted herein that there are distinct processor for the CPU block, video block, sound block, CD-ROM drive and Memory with their independent PCU's. This requires significant computing power and still has dumb (no intelligence) player input components.

Figure 6:
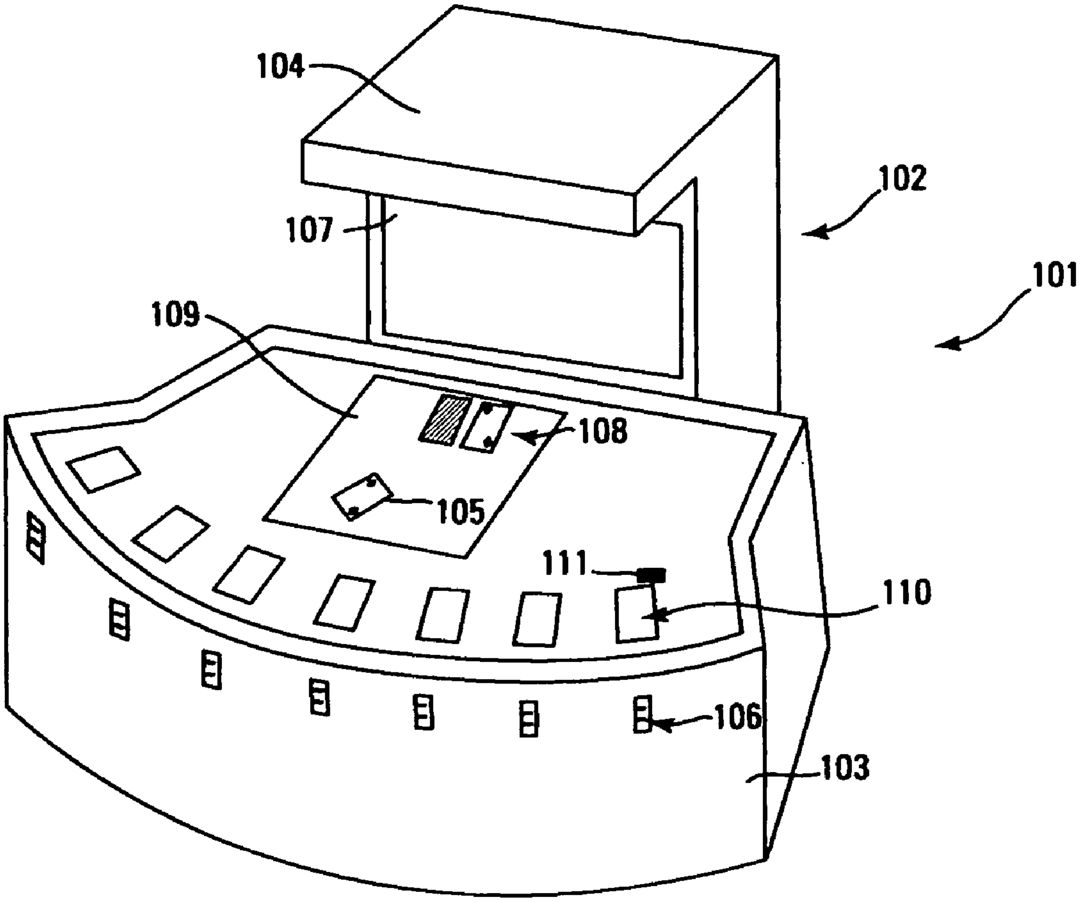
FIG. 6 shows a perspective view of a format for an automated gaming system according to the present invention.

FIG. 6 shows an example of an automated table system 101 useful to practice the game play methods of the present invention. The system 101 has an upright dealer display cabinet 102 with a top 104 and the dealer viewing screen 107 which may be any form of display screen such as a CRT, plasma screen, liquid crystal screen, LED screen or the like. The player bank arrangement 103 has a continuous display screen 109 on which images of cards being dealt 105, dealer's cards 108, bets wagered 111 and touch screen player input functions 110 are displayed. Other player input functions may be provided on a panel 106 which might accept currency, coins, tokens, identification cards, player tracking cards, ticket in/ticket out acceptance, and the like.

Figure 7:
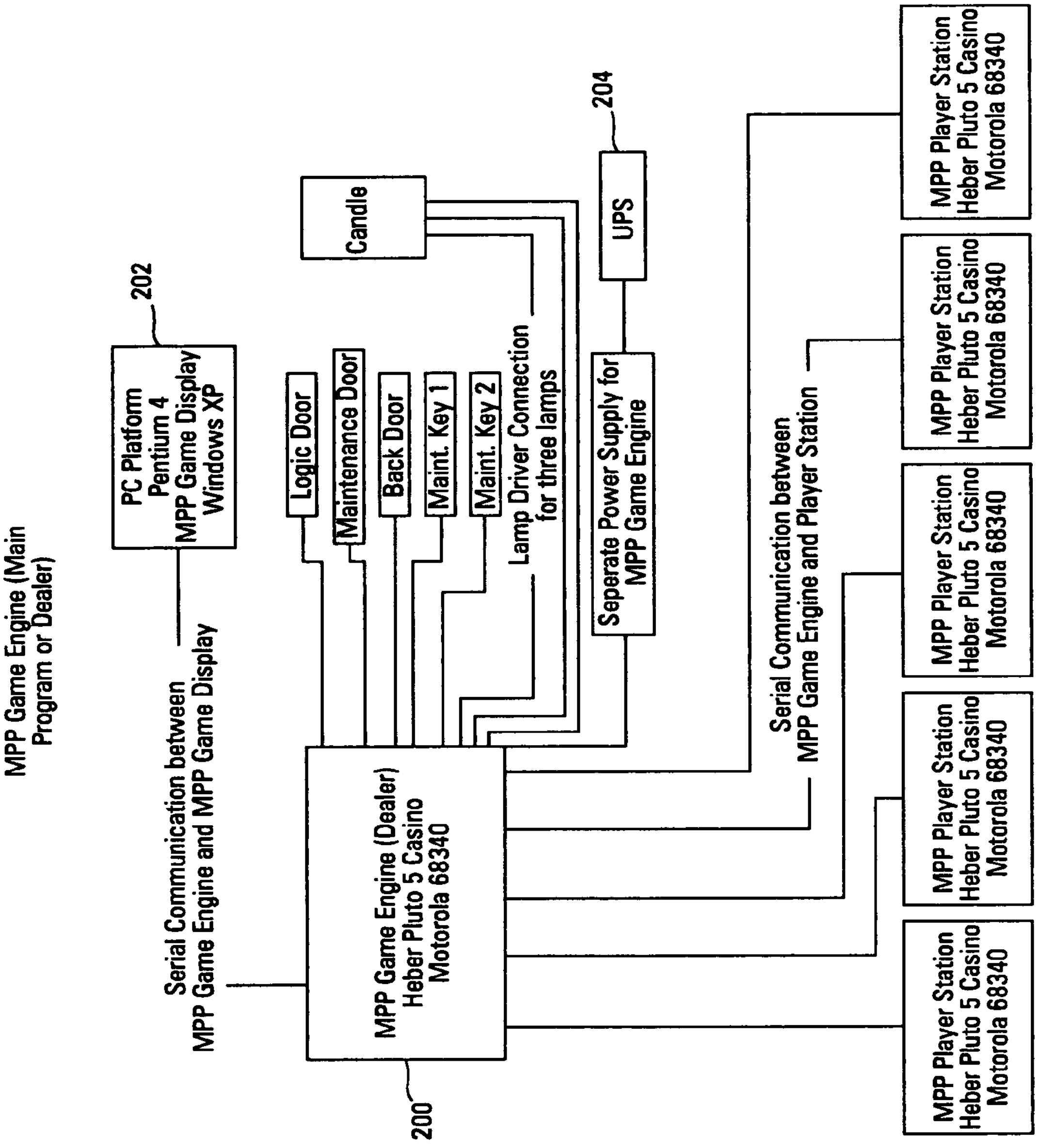
FIG. 7 shows a frontal view of a gaming engine useful in the practice of the present invention.

FIG. 7 shows an electronic/processor schematic for a MultiPlayer Platform (MPP) gaming system according to the presently described. The MPP Game engine (dealer) comprises a Heber Pluto 5 casino game board 200 (Motorola 68340 board) operating off the PC Platform Pentium® 4 MPP Game Display processor 202. The game display processor operates on a Windows XP platform. The respective subcomponents on the Pentium 4 processor are labeled to show the apportionment of activity on the motherboard and the component parts added to the board. As is shown, the game engine has an Uninterruptible Power Supply 204. The game display processor directs activity on the Speakers, directs activities onto the MPP Game Service panel, and the Plasma Monitor Card Table display. It is important to note that all communications are direct from the game display processor, freeing up resources available to the game engine processor.

Figure 8:
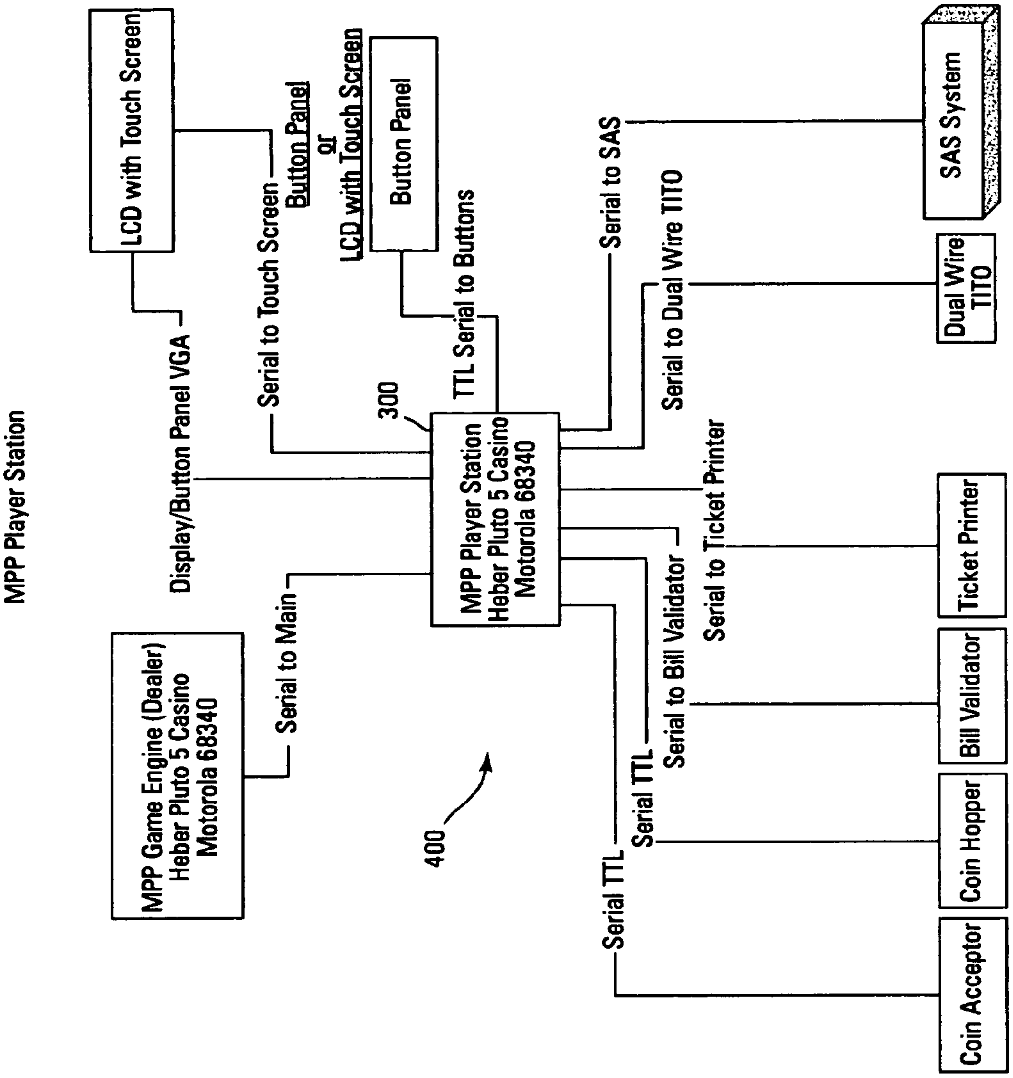
FIG. 8 shows a schematic of a player station useful in the practice of the present invention.

FIG. 8 shows the electronic/processing schematics of the MPP Player Station Intelligence board (Heber Pluto 5 Casino, Motorola 68340), each of which player stations (one for each player position) is in direct connection to the MPP Game Engine (Dealer), which is in turn directly connected to the PC Platform. (not shown in this Figure). Each Intelligence board receives information for all player input systems specific to that player station, such as the shown Coin Acceptor, Coin Hopper, Bill validator, Ticket Printer, Touch Screen and/or Display Button Panel, Dual Wire Ticket-in-Ticket-Out Printing and SAS System (SAS is one exemplary standard communications protocol used by a number of casinos central computer systems.) A significant benefit resides in the use of the independent Intelligence boards at each player position being in direct communication with the MPP Game Engine 300, as opposed to each individual player position button panel being dead or inactive until authorized by the main game processor, as previous automated gaming systems were constructed.

The above-described architecture is also an improvement in providing a system with not only the intelligence at each player position, but also in redistributing processing capability for functions among various processing components within the gaming system. In one architectural format, all functions of the gaming engine, except for the player localized intelligence functions, are consolidated into a single PC (e.g., the Pentium 4 shown in the Figures). This would include all game functions, player video functions, dealer video functions, dealer audio functions, security, central reporting (to a casino's central computer, for example), currency and debit functions, alarm functions, lighting functions, and all other peripherals on the system, except for the localized player functions. Alternatively, all functions requiring communication with the casino's main computer system are located on the player station intelligent boards. In this system, the main game processor would talk directly with the player intelligent boards, preferably in the same novel communication format described below.

Figure 9:
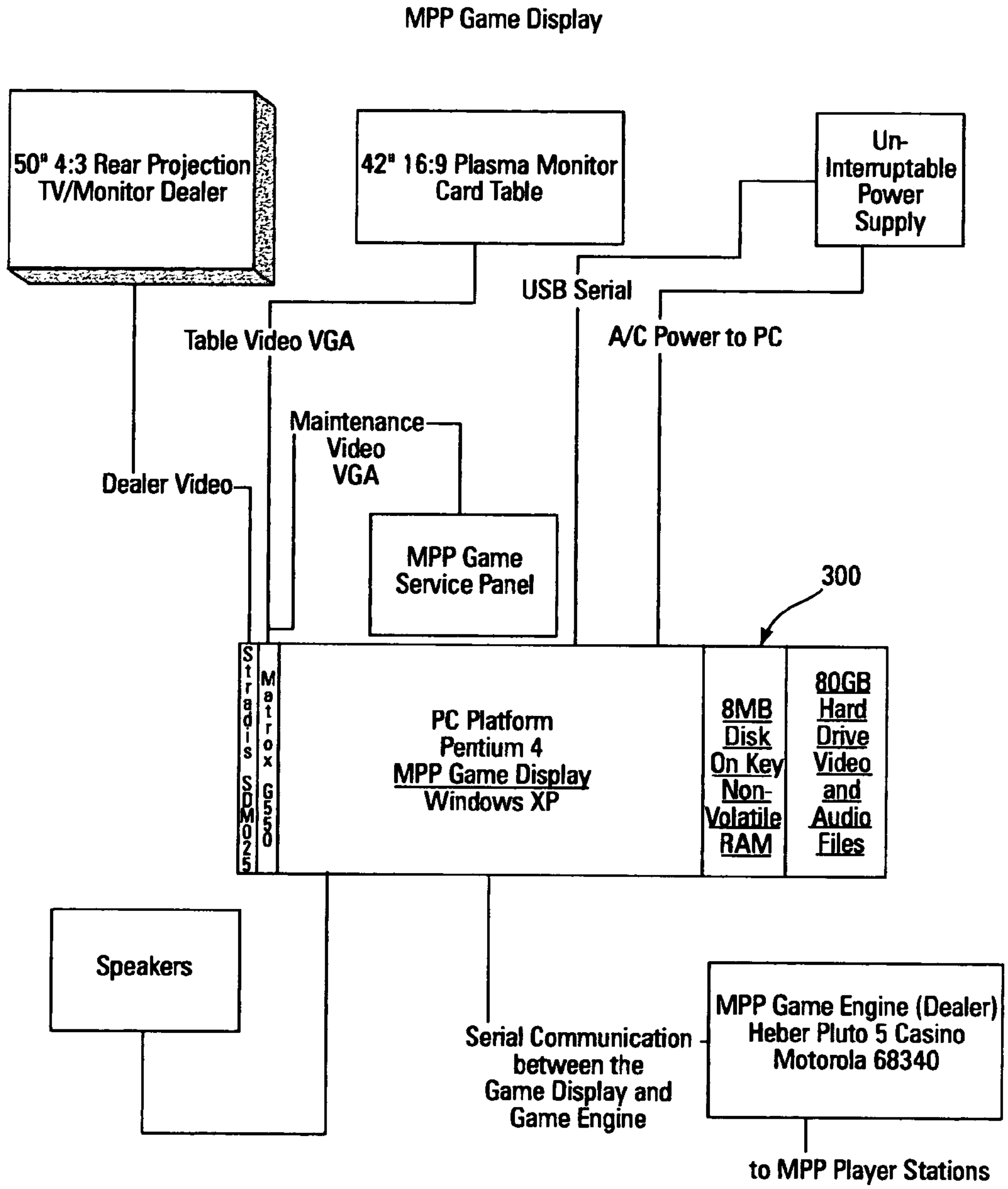
FIG. 9 shows a schematic of a preferred embodiment of a game display useful in the practice of the present invention.

An alternative system is shown in FIGS. 7, 8 and 9, where there is a dealer engine processor intermediate the main game PC and the Player intelligent boards. Both systems are a distinct improvement over the prior art, but with the higher power available for PC's, and with the ease of programming a PC as opposed to an embedded system, the consolidation of the game functions and the ability of the main game engine to communicate with each of the player positions is enabled. As shown in FIG. 8, the Game display processor 300 is preferably a Pentium® 4 PC and is separate from the main processor. With the player intelligent boards, the main game PC can receive packets of information from each player station as events occur rather than having to poll each player position on a regular basis 100 times to gain the specific information for each player input that may be made.

A description of the Heber Board, (an exemplary board that can be used as a player station processor and/or game engine processor 16A) a commercially available intelligent processing board is as follows. The Heber Board is known for its reliability and flexibility, especially for the Pluto 5 family of gaming products. The Pluto 5 is the controller of choice for the global gaming industry. Flexibility comes from a set of features built into the Pluto 5 (Casino) controller, and from the choice of optional add-on boards that can be used to adapt the Pluto family to best suit individual applications. In the area of interfacing, there are three distinct boards, each of which serves a particular function in helping the Pluto 5 to connect with the world outside:

RS485 Board

RS485 is an industrial-grade board for linking multiple systems in unforgiving circumstances for centralized information gathering. The Heber RS485 board is fully opto-isolated to provide complete circuit safety when used within 'electrically noisy' environments. The RS485 board uses a single RS232 connection to the Pluto 5 board and all necessary power is also derived through this link. Two header connectors may be provided for the RS485 channel to allow daisy chain connections between multiple systems.

HII/ccTalk Board

This board specializes in communicating with industry standard note/coin acceptors and payout hoppers. Equipped with dual communication channels, each port is configurable to use either the HII format to connect with Mars® coin/note acceptors or the ccTalk format for Money Controls® hoppers. Both channels are controlled via a single RS232 connection to the Pluto 5 board and all necessary power is also derived through this link. The Heber FastTrack™ package contains modular library functions for passing information via these channels.

Four Channel Relay Board

The relay board allows control of medium- to high-level loads such as solenoids, without risk of damage or interference to the Pluto 5 circuitry. Four power-switching channels are available with absolute isolation from the Pluto 5 control signals. Each relay is capable of switching direct or alternating currents of up to 7 A at a maximum voltage of 250V.

Like the Pluto 5 board itself, its modular options have been used extensively so that their designs are fully developed and entirely stable. The options that are specified are consistently provided in mass quantities. As with all Pluto products, programming for the modular options is straightforward. This is enhanced with the use of the Pluto 5 Enhanced Development Kit and also the FastTrack™ package. Between them, these kits contain all of the low level and high level programming tools and library functions needed for gaming applications. These systems can be provided through a Pluto 5 Enhanced Development Kit datasheet 80-15353-7 (Heber Limited, Belvedere Mill, Chalford, Stroud, Gloucestershire, GL6 8NT, UK Tel: +44 (0) 1453 886000 Fax: +44 (0) 1453 885013 www.heber.co.uk. Specifications for the various boards are identified below.

RS485 Interface

Host Interface

RS232 connection to Pluto 5/Pluto 5 Casino

All power provided via RS232 link from host system

Communication Port

Dual four-way Molex 0.1" KK headers for daisy chaining purposes

Dimensions

80×61 mm (3.14×2.4")

Part Number

Opto-isolated RS485 board 01-14536-2

HII/ccTalk Interface

Host Interface

RS232 connection to Pluto 5/Pluto 5 Casino

All power provided via RS232 link from host system

Communication Port

Single or dual 10 way header connectors

Dimensions 101.6×69.85 mm (4×2.8")

Part Number

Dual channel HII/ccTalk board 01-16171-2

Four Channel Relay Board

Host Interface

Connection to Pluto 5/Pluto 5 Casino via ribbon cable using four standard output lines All power provided via ribbon cable link from host system Switching Capabilities Up to 250V AC or DC @ 7A maximum per channel Dimensions 80×61 mm (3.14×2.4")

Part Number

Four channel relay board 01-15275-1 80-16949-1

One proposed hardware configuration uses a "satellite" intelligent processor at each player position. The player station satellite processor is substantially the same as the primary game engine processor, a Heber Pluto 5 Casino board. The satellite processors receive instruction from the primary game engine but then handle the communications with player station peripherals independently. Each satellite processor communicates with only the peripherals at the same player station. Thus each player station has a dedicated satellite processor communicating with only the peripherals at the same player station and with the casino's central computer system. The peripherals are, but not limited to: Slot accounting Systems, Bill Validator, Ticket Printer, Coin Acceptor, Coin Hopper, Meters, Button panel or LCD touch screen and various doors and keys.

The satellite processors run proprietary software to enable functionality. The player station software is comprised of two modules, the first being an OS similar to the game engine Operating System and the second being station software that handles peripheral communications. The software may be installed on EPROMs for each satellite processor. The primary method of communication between the satellite processors and the primary game engine is via serial connectivity and the previously described protocol. In one example, information packets are prepared by the satellite processors and are sent to the game engine processor on the happening of an event.

The proposed game engine provides communication to the player stations to set the game state, activate buttons and receive button and meter information for each player station. Communication is via a serial connection to each of the stations. The new protocol for communication between the game engine, game display and player stations is an event driven packet-for-packet bi-directional protocol with Cyclic Redundancy Check (CRC) verification. This is distinguished from the Sega system that used continuous polling. This communication method frees up resources in the same engine processor because the processor no longer needs to poll the satellites continuously or periodically.

The new protocol uses embedded acknowledgement and sequence checking. The packet-for-packet protocol uses a Command Packet, Response Packet and a Synchronization Packet as illustrated below. The protocol uses standard ASCII characters to send data and a proprietary verification method.

Format of Command Packet

| STX | SEQ | DATA LENGTH | DATA | CRC-16 | ETX |
|---|---|---|---|---|---|
| 1 | 1 | 3 | 3–999 | 5 | 1 |

Format of Response Packet

| STX | SEQ | DSP | PRV | ETX |
|---|---|---|---|---|
| 1 | 1 | 1 | 1 | 1 |

Format of Synchronization Response Packet

| STX | MTS | MRS | ETX |
|---|---|---|---|
| 1 | 1 | 1 | 1 |

Legend for Figures

| | |
|---|---|
| STX | Start of Packet Character |
| SEQ | Sequence # (Cycles from '0' thru '9') |
| LEN | Length of Data Area ('003' thru '999') |
| DATA | ASCII Data Fields Separated with '\|' Character |
| CRC | CRC-16 Value ('0000' thru '65535') Cyclic Redundancy Check |
| ETX | End of Packet Character |
| DSP | Disposition Code ('A' ACK, 'N' NAK, or 'I' Invalid Sequence) |
| PRV | Sequence Number of Last ACK'ed Packet (0 thru 9) |
| MTS | Main's Current Transmit Sequence Number |
| MRS | Main's Current Receive Sequence Number |

The Command Packet and Response Packet are used during primary game communications. The protocol uses redundant acknowledgement. For example: The packet is initially acknowledged when first received by the recipient. The same recipient will resend anther acknowledgement in the next communication. This second acknowledgement is the 'PRV' data in the response packet.

The communications between the Game Engine and the Player Station intelligence is preferably a transaction-based protocol. Either device can start a transaction, which is why it is essential that there be an intelligent board at each player position. All packets of information may be sent in any acceptable format, with ASCII format preferred as a matter of designer choice. All command packets usually contain a sequence number that is incremented after each successful packet exchange. The Game Engine and the Player Station intelligence use sequence numbers that are independent of each other. The sequence number keeps the communications in synchronization. This synchronization method is described later.

The command packet is used to send various commands such as Inputs, Lamps, Doors, Errors, Chirp, Game Results, player input, coin acceptance, player identification, credit acceptance, wagers, etc. . . . The command packet format may be, by ay of a non-limiting example:

<STX><Sequence number><Data Length><Data><CRC-16><ETX>

The data format with in the command packet may be:

<Address><Command><Field 1>|<Field 2>|<Field n>|

The response packet format may be:

<STX><Sequence number><Disposition><Previous ACK><ETX>

The sync request packet format may be:

<SYN>

The sync response packet format may be:

<STX><Mains Current Transmission Sequence><Mains Current Receive

Sequence><ETX>

A major strength of the protocol is its resilience of the Game Protocol and its ability to free up resources within the game engine. Those resources can in turn be used to provide more intricate games, and multi-media affects.

Synchronization Method:

The satellite and host must become synchronized in order to provide for reliable communications using packet numbers. To facilitate this, a novel protocol synchronization method that is used. Upon applying power to the satellite, or after a communications failure, the satellite automatically enters into synchronization mode. In the synchronization mode the satellite sends out the ASCII SYN (0×16) character about every second. It is expecting a special response packet containing transmit and receive packet sequence numbers to be used from that point on. After receiving the special response packet, the sequence numbers are used as-is, and not incremented until a successful packet exchange is completed. After communications is synchronized, the sequence numbers are incremented after each packet is successfully sent or received.

As was noted before, the main game processor may contain information, data, programming and other necessary functions to enable the play of multiple games off the same machine. For example, the main game engine may have rules and commands that will enable play of high and low games of the present invention and other card games. The system may be controlled so that different games may be played at different times on command of the casino or players.

The capabilities of technology are constantly expanding, and the improvements in technology should not be considered to avoid the underlying invention of the play of this game. For example, player monitoring systems, security systems, integrated systems where shufflers identify the number of cards and/or identify the specific cards and their positions in the play of the game are contemplated in the practice of the present invention.

There are a number of advantages in the game of the present invention. The fold rate on this game is approximately 21%, which is lower than the fold rate in other known games, such as Three Card Poker®. This feature is believed to attract and retain players, making the game more appealing to casinos.

Players win this game approximately over 40% of the time, which exceeds the expectation of many players, and increases player appeal. In some situations, e.g., when the player has a qualifying hand, additional betting opportunities are available, such as tripling down on the Ante, or even wagering 20× or 15× the Ante increasing player appeal.

By varying the number of cards made available to the dealer/banker and/or players, in forming the hands, by requiring the dealer's/banker's hand to qualify or by eliminating dealer qualification, by modifying the payouts and winning hand combinations possible on the bonus bet, by adding the Super Bonus bet etc., the payouts can be made to pay as high as 200:1, 500:1, or 2000:1, e.g., for Royal Flushes. This feature is believed to attract and retain more poker players.

What is claimed:

1. A casino game play method utilizing at least one deck of playing cards, the method comprising:

each player placing at least one wager to participate in the casino game;

dealing a first number of cards to a dealer, said first number of cards consisting of 7 cards and five cards from the 7 cards are used to make a dealer or banker 5-card hand;

dealing a second number of cards to each player, said second number of cards consisting of 6 cards and being greater than the number of cards to be used in determination of a 5-card poker rank band for each player, wherein each player forms a 5-card poker hand rank; and resolving each player hand against the dealer's hand according to predetermined game rules.

2. The casino game of claim 1 wherein physical cards are provided to each player and the dealer.

3. The casino game play method of claim 1 wherein the game is implemented on a multiple player gaming platform.

4. The casino game of claim 1 wherein the player makes an Ante wager prior to review of that player's second number of cards.

5. The casino game of claim 4 wherein after the player reviews that player's second number of cards, that player must place a wager of at least 1× the Ante wager to stay in the game.

6. The casino game of claim 4 wherein after the player reviews that player's second number of cards, that player must place a wager of at least 1× to stay in the game and may place a wager of greater then 1× the Ante wager when the player's resulting number of cards' hand exceeds at least a predetermined minimum poker ranking for a player's hand.

7. The casino game of claim 6 wherein the wager of greater than 1× is an amount equal to a multiple of the Ante wager up to 25× the amount of the Ante wager.

8. The casino game of claim 7 wherein the multiple of the Ante wager may be selected from the group consisting of 1×, 2×, 3×, 4×, 5× and each full integer multiple up to 25×.

9. The casino game of claim 1, wherein each player places at least one of an Ante and a Bonus Bet, and when a bonus bet is placed, paying the player a payout for achieving a predetermined winning card combination.

10. The casino game of claim 9, wherein multiple winning combinations are predetermined, and payouts and combinations are displayed on a pay table.

11. The casino game of claim 9 further comprising an automatic bonus paid on the ante for at least one predetermined winning combination.

12. The method of claim 1, and further including a mandatory Super Bonus bet, wherein payouts are made on the Super Bonus bet for predetermined hand ranks.

13. The method of claim 12 wherein the Super Bonus bet pays odds for predetermined winning hands.

14. The method of claim 13 wherein the players are paid an automatic bonus amount for a number of predetermined high-ranking hands.

15. The method of claim 13 wherein the multiple is between 1× and 25× the Ante.

16. The method of claim 12 wherein the Super Bonus and Ante bets are equal.

17. A casino game play method utilizing at least one deck of playing cards, the method comprising:

each player placing at least one wager to participate in the casino game;

dealing a first number of cards to a dealer, said first number of cards being 7 and wherein five cards are used to make a dealer or banker 5-card hand;

dealing a second number of cards to each player, said second number of cards being 6, wherein 5 cards are used to make each player a 5-card poker rank hand; and resolving each player hand against the dealer's hand according to predetermined game rules, and wherein, if the dealer's or banker's hand does not have at least a minimum predetermined rank of poker hand, the banker's hand is provided with one more additional card.

18. The casino game of claim 17 wherein the player makes an Ante wager prior to review of tat player's second number of cards.

19. The casino game of claim 18 wherein after the player reviews that player's second number of cards, that player must place a wager of at least 1× the Ante wager to remain in the game.

20. The casino game of claim 19 wherein after the player reviews that player's second number of cards, that player may place a wager of greater then 1× the Ante wager if the player's resulting number of cards' band exceeds at least a predetermined minimum poker rank for a player's hand.

21. The casino game of claim 20 wherein the wager of greater than 1× may be an amount equal to a multiple of the Ante wager.

22. The casino game of claim 20 wherein the multiple of the Ante wager may be selected from the group consisting of 1×, 2×, 3×, 4×, 5× and each full integer multiple up to 25×.

23. The casino game of claim 22 wherein physical cards are provided to each player and the dealer.

24. The casino game of claim 18 wherein physical cards are provided to each player and the dealer.

25. The casino game of claim 17 wherein physical cards are provided to each player and the dealer.

26. A live player-banked casino game play betting method comprising the steps of:

each player placing a first wager to participate in a live casino game;

a dealer dealing a first number of cards to each player, said first number of cards consisting of six cards to each player;

the dealer dealing a second number of cards to a banker hand, said second number of cards consisting of seven cards to the banker's hand;

each player optionally folding or making an additional bet that is a multiple of the first wager, wherein the multiplication factor is at least 1 and selected by the player;

wherein both the dealer excludes two cards from determining a 5-card hand to be ranked and each player excludes one card from each player's hand to form a 5-card hand to be ranked against the banker's hand; and resolving the wager according to predetermined game rules.

27. The method of claim 26 wherein the dealer is initially dealt seven cards and the players are initially dealt exactly six cards and resolution of game rules is based upon ranking of five card hands.

28. The method of claim 26 wherein the at least a first wager is an Ante and the player must make the additional wager to stay in the game, and the additional wager may be a multiple selected from values between 1× and 20×.

29. The method of claim 26 wherein the dealer is provided with one additional card to make the seven card initial hand for the banker's hand after receiving a dealer's initial six cards.

30. The method of claim 29 wherein the player may make an additional wager before the dealer receives the additional card for the banker's hand.

31. The method of claim 30 wherein the player may make the additional wager after the dealer has determined that the 5-card poker rank of the banker's hand in the initial cards dealt does not meet at least the rank of a banker's predetermined minimum 5-card poker rank.

32. A live player-banked casino game play betting method comprising the steps of:

each player placing a first wager to participate in a live casino game;

a dealer dealing six cards to each player;

the dealer dealing seven cards to the dealer as a banker's hand;

each player optionally folding or making an additional bet that is a multiple of the first wager, wherein the multiplication factor is at least 1 and selected by the player; and resolving the wager according to predetermined game rules wherein the dealer is initially dealt six cards and the players are initially dealt exactly six cards and resolution of game rules is based upon ranking of 5-card hands, and the dealer is dealt a seventh card for the banker's hand only if the dealer's best 5-card poker hand rank with the initial six cards in the banker's hand does not at least equal a predetermined banker's minimum hand rank.

33. The method of claim 32 wherein the banker's minimum hand rank is at least a rank selected from the group consisting of less than one pair and a specific pair.

34. The method of claim 32 wherein the banker's minimum hand rank is at least a rank of one pair of twos.

35. The method of claim 32 wherein the at least a first wager is an Ante and the player must make the additional wager to stay in the game, and the additional wager may be a multiple selected from the group consisting of 1×, 2×, 3×, 4×, 5× and each full integer multiple up to 29×.

36. A live player-banked casino game play betting method comprising the steps of:

each player placing a first wager to participate in a live casino game;

a dealer dealing six cards to each player;

the dealer dealing seven cards to the dealer as a banker's hand;

each player optionally folding or making an additional bet tat is a multiple of the first wager, wherein the multiplication factor is at least 1 and selected by the player; and resolving the wager according to predetermined game rules;

wherein the dealer is initially dealt six cards and the players are initially dealt exactly six cards and resolution of game rules is based upon ranking of 5-card hands, and the dealer is dealt a seventh card for the banker's hand only if the dealer's 5-card poker hand rank with the initial six cards in the banker's hand does not at least equal a predetermined banker's minimum hand rank;

wherein the at least a first wager is an Ante and the player must make the additional wager to stay in the game, and the additional wager may be a multiple selected from values between 1× and 20×; and wherein the multiple wager may exceed 1× only if the player's 5-card poker rank exceeds a predetermined players s minimum 5-card poker rank.

37. A live player-banked casino game play betting method comprising the steps of:

each player placing a first wager to participate in a live casino game;

a dealer dealing six cards to each player;

the dealer dealing seven cards to the dealer as a banker's hand;

each player optionally folding or making an additional bet that is a multiple of the first wager, wherein to multiplication factor is at least 1 and selected by the player; and resolving the wager according to predetermined game rules;

wherein the dealer is initially dealt six cards and the players are initially dealt exactly six cards and resolution of game rules is based upon ranking of 5-card hands, and the dealer is dealt a seventh card for the banker's hand only if the dealer's 5-card poker hand rank with the initial six cards in the banker's hand does not at least equal a predetermined banker's minimum hand rank; wherein the multiple wager may exceed 1× only if the player's 5-card poker rank exceeds a predetermined player's minimum 5-card poker rank.

38. A live player-banked casino game betting method comprising the steps of:

each player placing a first Ante wager to participate in a live casino game;

a dealer dealing a first number of cards to each player, said first number of cards consisting of six cards to each player;

the dealer dealing a second number of cards to the dealer, said second number of cards consisting of seven cards to the dealer as a banker's hand;

each player optionally folding or making an additional bet that is a multiple of the Ante wager, at the option of the player, but not necessarily equal to the Ante wager;

wherein both the dealer excludes two cards from determining a 5-card hand to be ranked and each player excludes one card from each player's hand to form a 5-card hand to be ranked against the banker's hand; and resolving the wager according to predetermined game rules.

39. The method of claim 38 wherein the dealer combines the Ante and additional bet after placement of the additional bet.

40. The method of claim 39 wherein the player is paid according to a pay table when the player's hand ranking exceeds the dealer's hand ranking.

41. A method of playing a wagering game, wherein each player competes against a dealer and/or banker hand, the method comprising:

each player making an Ante bet to participate in the game;

dealing a first number of cards comprising at least a part of a first hand to each player;

dealing a second number of cards comprising at least part of a second hand to the dealer, dealing an additional card or cards, if necessary to complete the player and dealer hands;

each players' complete hand consisting of a first number of cards, and the dealer's complete hand consisting of one more card than the first number of cards;

after viewing his cards, each player either folding or making a play bet that is a multiple of at least 1× the Ante, the multiple selected by the player from a range of multiples offered in the wagering game;

each player complete discarding at least one card from the player hand;

the dealer complete discarding two cards from the dealer hand;

comparing the hand values using poker rank as a criteria;

and awarding all players whose hand is of a higher rank than the dealer and banker hand a payout.

42. The method of claim 41, wherein the first and second number of at least part of a first hand of cards are not equal.

43. The method of claim 42, wherein the number of cards in the dealer hand is seven and the number of cards in the player's hands is 6, and each player and the dealer play with a best five card hand for a highest ranking five card poker hand.

44. The method of claim 41 and further comprising dealing at least one community card that is used to complete dealer and player hands.

* * * * *